US012745012B1

(12) United States Patent
Jordan et al.

(10) Patent No.: US 12,745,012 B1

(45) Date of Patent: Sep. 22, 2026

(54) STATION FOR INDUCTING ITEM(S) INTO ENVIRONMENT

(71) Applicant: Amazon Technologies, Inc., Seattle, WA (US)

(72) Inventors: Timothy Joseph Jordan, Seattle, WA (US); Allan Katz, Seattle, WA (US); Christopher James Thomas, Seattle, WA (US); Victoria Joy Asman, Seattle, WA (US); Briana Robin Jones, Seattle, WA (US); Arianne Etta Spaulding, Seattle, WA (US); Frank Preiswerk, Brooklyn, NY (US); Michael Robert Bocamazo, Framingham, MA (US); Siyao Hu, Grafton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 18/604,827

(22) Filed: Mar. 14, 2024

(51) Int. Cl.

| | |
|---|---|
| ***H04N 23/90*** | (2023.01) |
| ***G06V 10/147*** | (2022.01) |
| ***H04N 23/56*** | (2023.01) |
| *G06K 7/14* | (2006.01) |

(52) U.S. Cl.

CPC ........... *H04N 23/90* (2023.01); *G06V 10/147* (2022.01); *H04N 23/56* (2023.01); *G06K 7/1413* (2013.01)

(58) Field of Classification Search

CPC ...... H04N 23/90; H04N 23/56; G06V 10/147; G06K 7/1413

USPC .......................................................... 348/159

See application file for complete search history.

(56) References Cited

U.S. PATENT DOCUMENTS

| | | | | |
|---|---|---|---|---|
| 2017/0169672 A1* | 6/2017 | Farrow | .............. | G06K 7/10366 |
| 2018/0089474 A1* | 3/2018 | Ramon | ................ | B65G 1/1375 |
| 2022/0289484 A1* | 9/2022 | Oberpriller | ............ | B65G 47/57 |
| 2024/0059255 A1* | 2/2024 | Herse | .................... | G01S 7/4813 |

* cited by examiner

*Primary Examiner* — James T Boylan

(74) *Attorney, Agent, or Firm* — Eversheds Sutherland (US) LLP

(57) ABSTRACT

A station is used to induct item(s) into an environment. The station includes a case module configured to receive the item(s), which may be packaged in a box, and sensor(s) configured to scan the box. A camera and lighting module of the station may read the item(s) as they are unpackaged from the box and transferred into one or more totes located on a tote module. The item(s) may be passed over the camera and lighting module and then placed into the tote. Sensor(s) are used to determine which of the one or more totes the item(s) are placed. As the tote(s) become full, the tote(s) may be inducted into the environment for storage, order fulfillment, etc. The station may be used to conveniently remove item(s) from their boxes and place the item(s) into the totes that allow automated storage systems to move the totes throughout the environment.

20 Claims, 18 Drawing Sheets

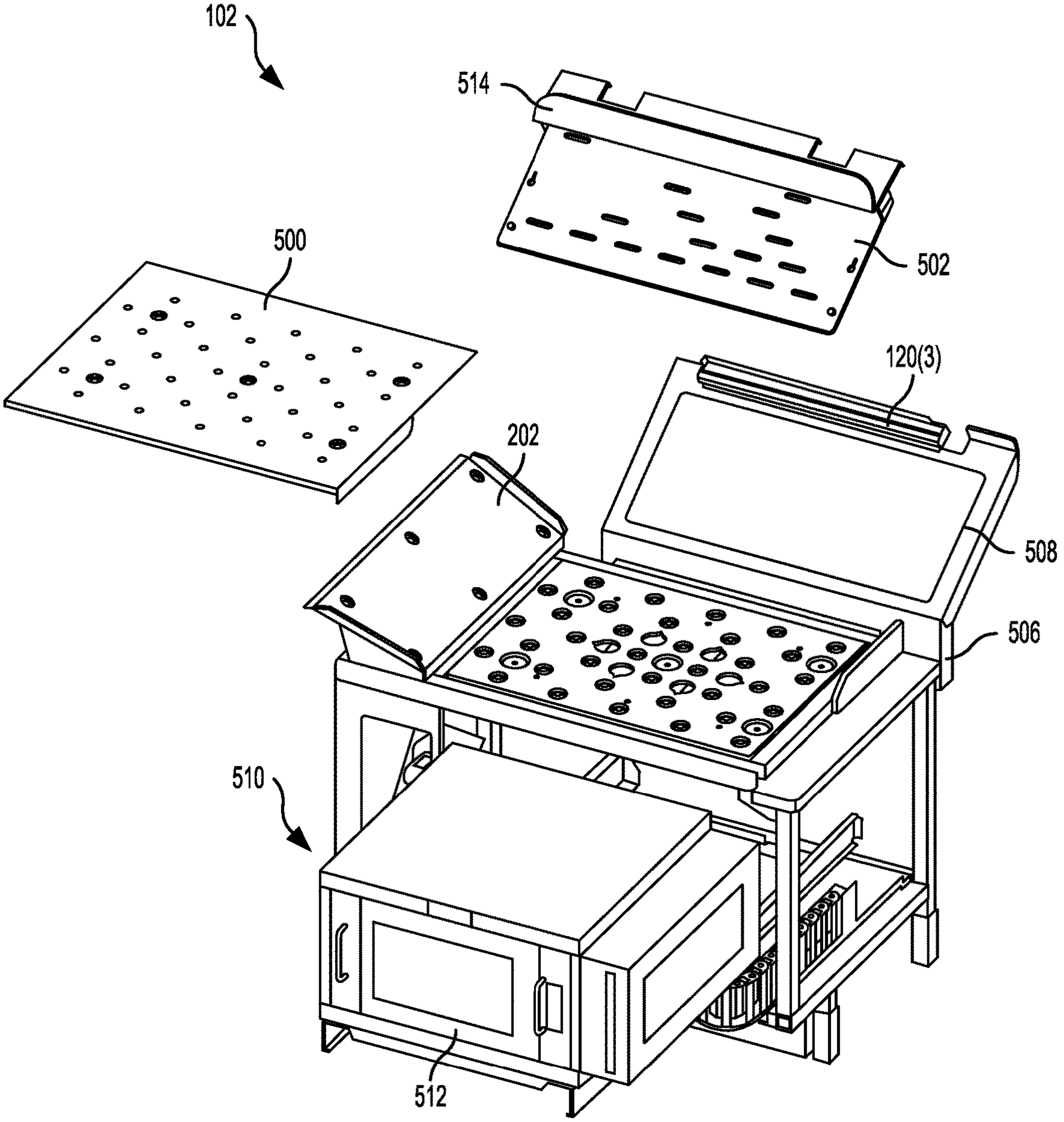
FIG. 5B
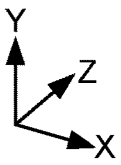

STATION FOR INDUCTING ITEM(S) INTO ENVIRONMENT

BACKGROUND

Retailers, wholesalers, and other product distributors maintain an inventory of items that may be ordered, leased, rented, and so forth. For example, an e-commerce retailer may maintain inventory in a fulfillment center. The rise of e-commerce has brought about an increase in order fulfillment, packaging, and shipment. Consequently, to meet these demands, retailers, for example, are required to restock items at faster rates. However, retailers are not equipped to handle the increased restocking rate, leading to errors, inefficiencies, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIGS. 5A and 5B illustrate an example case module of the station of FIG. 1, according to examples of the present disclosure.

DETAILED DESCRIPTION

Figure 1:
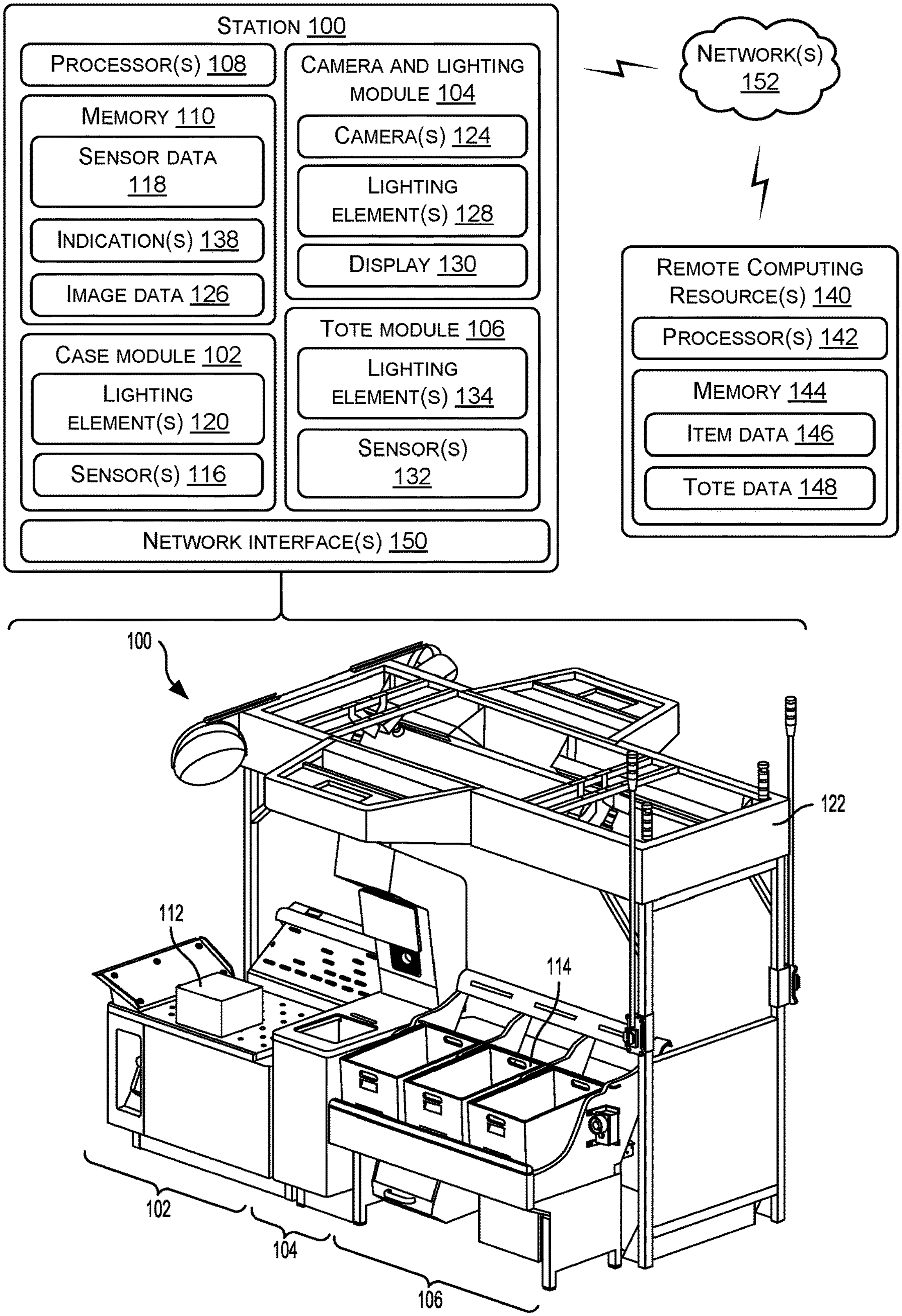
FIG. 1 illustrates an example station used to induct item(s) into an environment, and example components of the station, according to examples of the present disclosure.

This application is directed, at least in part, to a station that is used to induct (e.g., decant) item(s) into an environment, according to examples of the present disclosure. The station may include a case module configured to receive the item(s), which may be packaged in a box (e.g., corrugate box), for example, and sensor(s) configured to read (e.g., scan, image, etc.) the box. A camera and lighting module of the station may read the item(s) as they are unpackaged from the box and transferred into one or more totes located on a tote module. For example, the item(s) may be unboxed from the box, passed over the camera and lighting module, and then placed into the tote. Sensor(s) may be used to determine which of the one or more totes the item(s) are placed. As the tote(s) become full, the tote(s) may be inducted into the environment for storage, order fulfillment, and so forth. The station as described herein may be used to conveniently remove item(s) from their boxes and place the item(s) into the totes that allow automated storage systems to move the totes throughout the environment to pickers and robotic devices for order fulfillment. As such, the station may increase a throughput of item(s) being inducted, may be conveniently operated by associates, and/or may reduce errors associated with inducting item(s).

The station may receive the item(s) from one or more conveyors disposed throughout the environment. For example, a conveyor may deliver, transport, etc. item(s) to the station. In some instances, the item(s) may be sorted, packaged, or otherwise reside within boxes, cases, containers, envelopes, packages, etc. The associate operating, or working at, the station may retrieve the boxes and maneuver the boxes onto the case module. In some instances, a ramp may be disposed between the conveyor and the case module to allow the associate to easily maneuver the box onto the case module and/or to allow an ergonomic height for the associate to handle the boxes. The boxes may contain any number of item(s) (e.g., one, three, ten, etc.), and the boxes may include any type of item (e.g., electronics, household goods, widgets, clothing, etc.). In some instances, the item(s) may be individually package, such as within plastic wrap, boxes, etc.

At the case module, one or more sensors (e.g., cameras) may image a barcode, label, identifier, etc. on the box. In some instances, the one or more sensors may be disposed on a frame and reside vertically above the case module. Imaging the barcode is used to determine specifics of the item(s) contained within the box, such as a type of item, an identifier of the item, a quantity of the item(s) in the box, and/or other characteristics of the item (e.g., weight, material, size, etc.). More generally, the one or more sensors may be used to determine the item(s) inducted into the environment for purposes of updating an inventory of the environment, for example. Moreover, lighting elements may illuminate the box to enable the one or more sensors to image the barcode of the box. The lighting elements may be disposed on the frame and/or the case module. In some instances, the case module may include a ball bearing platform to permit the associate to conveniently rotate, flip, or otherwise maneuver the box (e.g., for unpacking, imaging by the one or more sensors, etc.).

At the case module, the associate may open the box and unpackage the item(s). For example, the associate may open the box using a tool (e.g., scissors, box knife, etc.). Once opened, the associate may retrieve the item(s), and pass (e.g., move) the item(s) over, through, etc. the camera and lighting module. The camera and lighting module may include one or more sensor(s) (e.g., camera(s), LIDAR, etc.) for imaging (e.g., scanning, reading, etc.) a barcode, label, identifier, etc. on the item(s). In some instances, each of the item(s) may include a respective barcode, for example, for being imaged by the one or more sensor(s) of the camera and lighting module. The associate may manipulate the item(s) across the camera and lighting module for being imaged by the one or more sensor(s). However, the associate may not be required to utilize a scanner (e.g., hand scanner) to read the identifier of the box.

In some instances, the one or more sensor(s) that image the item(s) may include four sensors, where the four sensor(s) may be oriented in different directions and/or have different fields of view (FoV) to successfully image the barcode on the item(s). For example, a first sensor may be oriented in a first direction and have a first FoV, a second sensor may be oriented in a second direction, different than the first direction, and a have a second FoV, a third sensor may have be oriented in a third direction, different than the second direction, and have a third FoV, and a fourth sensor may be oriented in a fourth direction, different than the third direction, and have a fourth FoV. In some instances, the first FoV, the second FoV, the third FoV, and the fourth FoV may at least partially overlap with one another.

In some instances, lighting elements of the camera and lighting module may illuminate the item(s) in order to permit the sensor(s) to sense, read, image, etc. the barcode. The lighting elements, in some instances, may represent ring lighting elements disposed around the sensor(s), respectively. For example, a first ring lighting element may be disposed around the first sensor, a second ring lighting element may be disposed around the second sensor, and so forth. Moreover, baffles, louvers, etc. may be used to reduce straying of light emitted via the lighting elements. For example, the baffles may prevent the light being glared into eyes of the associate working at the station. In some instances, the baffles may be defined at least in part by a housing in which the sensor(s) and/or the lighting elements are disposed. The housing may define a channel in which the sensor is at least partially disposed. The baffles may be disposed in front of the lighting elements. Shields, deflectors, and the like, in addition or alternative from the baffles, may be used to prevent light glaring into the eyes of the associate. The baffles may be made of a material, or include a surface finish, that also reduces the glare.

Once the item(s) are imaged, the associate may place the item(s) into one or more tote(s) that resides on/within the tote module. The tote(s) may represent any suitable container, bin, tub, etc. into which the item(s) are placed. The tote(s) may have an open top into which the item(s) are deposited by the associated. In some instances, the item(s) from the box may be placed in the same tote or different totes. In some instances, the tote module may receive any number of totes (e.g., one, two, five, etc.), and/or different types of totes may be used. The tote module may include dividers that are located between adjacent totes.

One or more sensor(s) may image the item(s) as the item(s) are deposited into the tote(s) to know in which tote the item is deposited. For example, the one or more sensor(s) (e.g., cameras, LIDAR, etc.) may be used to detect in which tote the item(s) where deposited. In some instances, the one or more sensor(s) may be disposed on the frame, overhead of the tote module, oriented in a direction towards the tote(s), and/or on the tote module. Moreover, the one or more sensor(s) (or alternative sensor(s)) may image (e.g., scan, read, etc.) a barcode, label, identifier, etc. on the tote(s). This allows the item(s) to be associated with a certain tote, for example, to know which tote (amongst the plurality of totes) the item(s) are placed into. As the tote travels about the environment, the barcode of the tote may be imaged to determine the item(s) within the tote.

As the tote(s) become full, the tote(s) may be inducted into the environment using conveyors, chutes, robotic elements, etc. For example, the associate may move the tote onto a conveyor that transports the tote to other locations, stations, etc. within the environment for sorting, packaging, order fulfillment, and the like. In some instances, the associate may push the tote onto the conveyor or actuators may push the tote onto the conveyor. The tote module may include rollers, slides, etc. that permit movement of the totes from the tote module to the conveyor. For example, the tote module may have a frame with rollers that define a rolling surface, platform, etc. on which the totes are disposed. The frame may be include any numbers of bars, struts, members, etc., and the rollers may be coupled to the frame. Once the totes are inducted, other totes may be replenished (e.g., replaced) at the tote module.

In some instances, the tote module may include a fullness mechanism that is used to detect if the tote is too full, for example, above a top of the tote. The fullness mechanism may represent a cord, bar, etc. that resides above the tote. If the tote is inducted, but is too full and item(s) extend above the top of the tote, the item(s) may contact the fullness mechanism. This contact may be used to provide an indication to the associate (e.g., visual, audible, etc.) and/or one or more operations at the station may be halted. Additionally, or alternatively, sensor(s) (e.g., the one or more sensor(s) at the tote module) may be used to determine whether the item(s) extend beyond the top of the tote. Other information, however, may be used to control a fill of the totes. For example, the totes may not be loaded beyond a threshold weight. A weight of the item(s) may be determined via imaging the barcode of the item, and once the item is placed in a tote, that weight may be associated with the tote.

The tote module may include indicators, such as light indicators, which provide indications of whether the totes are full (and need to be inducted), whether totes are located on the tote module (e.g., loaded), which tote the item(s) need to be deposited, and so forth. The tote module may include light indicators that are associated with each of the totes at the tote module. For example, if the tote module holds three totes, the tote module may include light indicators associated with the three totes, respectively. The light indicators may be located above, below, beside, etc. the totes, on one or more frames of the tote module.

As an example operation of the light indications, a first indication (e.g., first color of light, such as blue) may be output when the tote is placed at the tote module. The first indication may indicate that the associate may place item(s) into the tote. A second indication (e.g., a second color of light, such as orange) may be output when the tote is inducted or when a tote is absent from the tote module. The second indication may indicate to the associate to avoid placing item(s) at the previous location of the inducted tote (i.e., being as no tote is located at that location). Once a new tote is replenished in lieu of the previously inducted tote, the first indication may be output, indicating that the associate may place item(s) in the new tote. The one or more sensor(s) at the tote module may be used to determine the presence of the totes at the tote module for causing the first indication and the second indication to be output. Similar indications may be output for the other totes at the tote module.

In some instances, the station includes a display, screen, etc. that displays information associated with the item(s) being scanned, a fill of the tote, and so forth. For example, as the item(s) are imaged by the one or more sensor(s) of the camera and lighting module, information associated with the item(s) may be displayed on the display (e.g., a type of item, an identifier of the item, characteristics of the item, such as weight, material, size, etc., and so forth). Moreover, the display may display indications of the totes on the tote module, and the relative fill volume, percentage, weight, etc. of the totes. In some instances, the display may be a component of the camera and lighting module.

The station, and/or the individual module(s) (e.g., the case module, the camera and lighting module, the tote module, etc.) may include suitable controllers, computing components (e.g., processors, memory, etc.), etc. to perform the operations described herein. The station, or the modules of the station, may process data (e.g., sensor data) obtained from the sensor(s), the camera(s), and so forth. The modules may also be communicatively connected together to enable processing of the item(s) through the station. The station may include network interface(s) (e.g., Bluetooth, Wi-Fi, etc.) for communicating over one or more network(s) with computing device(s) internal and/or external to the environment. For example, the station may communicatively connect to remote computing resource(s) to update a database that records the totes in which the item(s) are deposited, update a database of inventory, and so forth.

Although the station is described as including certain components (or modules), the station may include different components other than those described. The station, although described as a station, may represent a machine, piece of equipment, device, system, assembly, etc. and the like. In some instances, the station may be transportable (e.g., on wheels) throughout the environment. Additionally, any number of stations may be disposed about the environment, and the stations may be used for alternate purposes other than inducting item(s). For example, station (or portions thereof) may be used to sort food (e.g., at a grocery store), sort luggage (e.g., at an airport), and so forth.

In some instances, the frame may be disposed more than one case module, more than one camera and lighting module, and/or more than one tote module. For example, a first station may include a first case module, a first camera and lighting module, and a first tote module. A second station may include a second case module, a second camera and lighting module, and a second tote module. The frame, however, may be disposed over both the first station and the second station. The sensor(s) of the frame (e.g., for scanning the boxes) may be oriented to scan first boxes arriving at the first case module and second boxes arriving at the second case module, for example.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example station 100 in which item(s) are inducted into an environment, according to examples of the present disclosure.

In some instances, the station 100 may include a case module 102, a camera and lighting module 104, and a tote module 106. The case module 102, the camera and lighting module 104, and the tote module 106 may represent different segments, areas, components, etc. of the station 100. However, although described as separate modules, for example, the case module 102, the camera and lighting module 104, and the tote module 106 may collectively represent the station 100, and the station 100 may include more than, or less than, the number of modules described herein. Moreover, the modules may include different functionalities and/or structures than those described herein. As shown, the station 100 may include processor(s) 108 and memory 110, where the processor(s) 108 may perform various functions and operations described herein, and the memory 110 may store instructions executable by the processor(s) 108 to perform the operations described herein. In some instances, each of the case module 102, the camera and lighting module 104, and/or the tote module 106 may have their own respective processor(s) and memory.

In some instances, the station 100 may be operated or manned at least in part by an associate. The associate may retrieve boxes 112, such as packages, cases, cartons, bins, containers, etc. and maneuver the boxes 112 onto the case module 102. The boxes 112 may be made of corrugate, plastic, etc. In some instances, the boxes 112 may be transferred to the case module 102 one by one, or more than one box 112 may reside on the case module 102. As will be explained herein, the boxes 112 may arrive at the station 100 via conveyors, chutes, robotic elements, etc.

The boxes 112 themselves may include item(s) that are to be inducted, or otherwise decanted, into the environment for storage, inventory, distribution, order fulfillment, and the like. The boxes 112 may contain any number of item(s) (e.g., one, three, ten, etc.), and the boxes 112 may include any type of item (e.g., electronics, household goods, widgets, clothing, etc.). In some instances, the item(s) may be individually packaged, such as within plastic wrap, boxes, etc. At the case module 102, the boxes 112 may be opened (e.g., using a box cutter, etc.) to reveal the item(s) and permit the item(s) to be sorted from the boxes 112 to totes 114 located at the tote module 106.

The boxes 112 may include identifier(s) (e.g., barcode) that are read (e.g., scanned, imaged, etc.) by sensor(s) 116 (e.g., camera(s), scanner(s), etc.) of the case module 102 and/or the station 100 for determining content(s) of the boxes 112. For example, sensor data 118 (or image data) generated by the sensor(s) 116 may be used to determine details of the item(s) contained in the boxes 112, such as a quantity of the item(s), a type of the item(s), a weight of the item(s), and so forth. However, the associate operating at the station 100 may not be required to utilize a scanner (e.g., hand scanner) to read the identifier of the box 112.

In some instances, the sensor(s) 116 may be disposed overhead of the case module 102, on a frame 122 of the station 100. The sensor(s) 116 may be oriented towards the case module 102 and the boxes 112 contained on the case module 102. Any number of the sensor(s) 116 may be used to read the boxes 112 and the sensor(s) 116 may have different FoVs. The associate working at the station 100 may manipulate (e.g., rotate, flip, etc.) the boxes 112 for enabling the sensor(s) 116 to read the identifier on the boxes 112. Additionally, lighting element(s) 120 may assist in illuminating portions of the case module 102 and/or the boxes 112 for allowing the sensor(s) 116 to read the identifier. The lighting element(s) 120 be disposed on the case module 102 and/or the frame 122. In some instances, baffles, deflectors, etc. may be disposed adjacent to the lighting element(s) 120 to reduce glare experienced by the associate. A material or surface finish of the baffles may also serve to reduce the glare.

As the associate retrieves the item(s) from the box 112, the associate may pass (e.g., move) the item(s) over, through, etc. the camera and lighting module 104. The camera and lighting module 104 may include one or more camera(s) 124 to read (e.g., scan, image, etc.) a barcode, label, identifier, etc. on the item(s). In some instances, each of the item(s) may include a respective barcode, for example, for being read by the one or more camera(s) 124 of the camera and lighting module 104. For example, the camera(s) 124 may capture image data 126 that is used to determine details of the item(s). The associate may manipulate the item(s) across the camera and lighting module 104 for being imaged by the one or more camera(s) 124.

As will be explained herein, in some instances, the camera and lighting module 104 may include multiple of the camera(s) 124 to read the barcode of the item(s). In some instances, the camera and lighting module 104 may include four cameras, where the four camera(s) may be oriented in different directions and/or have different FoV to successfully read the barcode on the item(s). For example, a first camera may be oriented in a first direction and have a first FoV, a second camera may be oriented in a second direction, different than the first direction, and a have a second FoV, a third camera may have be oriented in a third direction, different than the second direction, and have a third FoV, and a fourth camera may be oriented in a fourth direction, different than the third direction, and have a fourth FoV. In some instances, the first FoV, the second FoV, the third FoV, and the fourth FoV may at least partially overlap with one another. In some instances, the first camera, the second camera, the third camera, and/or the fourth camera may be disposed on a frame, housing, etc. of the case module 102, and/or the frame 122 of the station 100.

In some instances, the camera and lighting module 104 includes lighting element(s) 128 that illuminate the item(s) in order to permit the camera(s) 124 to read the barcode. For example, the lighting element(s) 128 may illuminate the FoVs of the camera(s) 124. The lighting element(s) 128, in some instances, may represent ring lighting elements disposed around the camera(s) 124, respectively. For example, a first ring lighting element may be disposed around the first camera, a second ring lighting element may be disposed around the second camera, and so forth. Moreover, baffles may be used to reduce straying of light emitted via the lighting element(s) 128. For example, the baffles may prevent the light being glared into eyes of the associate working at the station 100. Shields, deflectors, and the like, in addition or alternative from the baffles, may be used.

In some instances, the station 100, such as the camera and lighting module 104, includes a display 130 that displays information associated with the item(s) being scanned, a fill of the totes 114, and so forth. For example, as the item(s) are imaged by the camera(s) 124, information associated with the item(s) may be displayed on the display 130 (e.g., a type of item, an identifier of the item, characteristics of the item, such as weight, material, size, etc., and so forth). The display 130 may also display indications of the totes 114, and the relative fill volume, percentage, weight, etc. of the totes 114.

Once the item(s) are scanned, the associate may place the item(s) into the totes 114 that resides on/within the tote module 106. In some instances, the item(s) from the box 112 may be placed in the same tote 114 or different tote 114. The totes 114 may represent any suitable container, bin, tub, etc. into which the item(s) are placed. The totes 114 may be manufactured from plastic, fabric, or other suitable material. Moreover, the totes 114 may include handles, grips, knobs, etc. to permit the associate to maneuver the totes 114. In some instances, the totes 114 may have an open top into which the items are deposited by the associate. The totes 114 may arrive at the station 100 via any suitable manner and the associate may stock the totes 114 (e.g., when totes 114 become full and are in need of replacement). In some instances, the associate may stock the totes 114 manually, or the totes 114 may be automatically restocked (e.g., via robotic elements, end effectors, etc.)

The tote module 106 is configured to hold, store, receive, etc. any number of the totes 114. For example, in FIG. 1, the tote module 106 may receive three of the totes 114, however, more than or less than three of the totes 114 may be received in the tote module 106. Each of the totes 114 may be received in a tote slot, for example, where each of the totes 114 are disposed in a tote slot. Dividers, partitions, etc. may separate each of the totes 114, between the tote slots. Each of the tote slots may include rollers to maneuver the totes 114.

The totes 114 may also have an identifier (e.g., barcode) that may be read (e.g., scanned, imaged, etc.) by sensor(s) 132 of the tote module 106. Each of the totes 114 may be associated with a respective identifier, where the identifier is utilized to identify the totes 114 amongst one another. Moreover, the identifier of the totes 114 may be used to associate certain item(s) with the tote 114, for example, where the association indicates what item(s) are placed into the tote 114. This may allow for a weight of the totes 114 to be known, a fill volume of the totes 114 to be known, what item(s) are deposited into the totes 114 to be known, and so forth. In some instances, the sensor(s) 132 may be disposed on the frame 122, overhead of the tote module 106, oriented in a direction towards the totes 114, and/or on the tote module 106.

In some instances, the tote module 106 includes one or more lighting element(s) 134 to illuminate the tote module 106, such as the totes 114, identifier(s) on the totes 114, and so forth. The illumination permits the sensor(s) 132, for example, to scan, read, image, etc. the totes 114 and the item(s) placed in the totes. Additionally, as will be discussed herein, the tote module 106 may include additional lighting elements that output indication(s) 138 associated with a state of the tote module 106 and/or the totes 114. For example, lighting element(s) may output a first indication when the totes 114 are present and ready to be filled, and may output a second indication when the totes 114 are absent, full, etc. As shown in FIG. 1, where three of the totes 114 are present and capable of being filled, the lighting element(s) may output the first indication. Each of the tote slots may have a respective lighting element, where the lighting element outputs an indication 138 that indicates the state, presence, etc. of the tote 114 within the tote slot. However, as the totes 114 become full, and are removed from the tote module 106, the lighting element(s) may output the second indication. Here, sensor(s) 132 (e.g., LIDAR, camera(s), etc.) of the tote module 106 may recognize the lack of presence (i.e., absence) of the tote 114 and subsequently cause the lighting element(s) to output the second indication. Subsequently, this may signify to the associate as to the absence of the tote 114 to avoid placing item(s) into the tote slot once occupied by the tote 114. Once a new tote 114 is replaced, and the sensor(s) 132 sense the presence of the tote, the lighting element(s) may output the first indication. The sensor(s) 132 generate the sensor data 118 that is analyzed to determine the presence or the absence of the tote 114.

Moreover, the sensor(s) 132 may be used to determine in which tote 114 the item(s) where deposited. In doing so, the item(s) to be associated with a certain tote, for example, to know which tote 114 (amongst the plurality of totes 114) the item(s) where placed into. As the tote travels about the environment, the barcode of the tote 114 may be imaged to determine the item(s) within the tote 114 to subsequently cause the tote 114 (and/or the items) to be sorted throughout the environment.

In some instances, the station 100 may communicatively couple to remote computing resource(s) 140. As shown, the remote computing resource(s) 140 may include processor(s) 142 and memory 144, where the processor(s) 142 may perform various functions and operations described herein, and the memory 144 may store instructions executable by the processor(s) 142 to perform the operations described herein. For example, the station 100 may communicatively couple to the remote computing resource(s) 140 for determining details of the item(s) and/or operations to be performed by the station 100 (e.g., outputting the indication(s) 138). In some instances, the remote computing resource(s) 140 may store item data 146, where the item data 146 indicates the type of item, a material of the item, a weight of the item, and so forth being scanned by the camera and lighting module 104. The station 100 may additionally or alternatively store, or have access to, the item data 146.

The remote computing resource(s) 140 may also store tote data 148, where the tote data 148 indicates which of the totes 114 the item(s) are placed into. For example, once the item(s) are stored in a tote 114, the item(s) may be associated with the tote 114. As the tote 114 traverses about the environment, and the identifier of the tote 114 is scanned, the item(s) contained within the tote 114 may be known. The tote data 148 may therefore indicate, for the totes 114 within the environment, the item(s) stored therein (e.g., type, quantity, weight, etc.).

The modules of the station 100 may be communicatively connected together for processing the item(s) through the station 100. The station 100, or the modules, may include network interface(s) 150 (e.g., Bluetooth, Wi-Fi, etc.) for communicating over one or more network(s) 152 with the remote computing resource(s) 140, electronic devices, and the like, whether internal and/or external to the environment. For example, as noted above, the station 100 may communicatively connect to remote computing resource(s) 140 to determine information associated with the item, and/or may connect to the remote computing resource(s) 140 to update a database that record the totes 114 in which the item(s) are deposited, update a database of inventory, and so forth.

In some instances, the station 100 may be transportable (e.g., on wheels) throughout the environment. Additionally, any number of the stations 100 may be disposed about the environment, and the stations 100 may be used for alternate purposes other than inducting item(s). Although certain components are shown being associated with certain modules of the station 100, the components may be rearranged differently and/or associated with different modules. For example, although the lighting element(s) 120, the lighting element(s) 128, and the lighting element(s) 134 are described as different lighting elements, the lighting element(s) 120, the lighting element(s) 128, and the lighting element(s) 134 may represent lighting element(s) of the station 100. The station 100 may also include sensor(s), which represent the sensor(s) 116 and the sensor(s) 132.

In some instances, the frame 122 may be disposed over more than one case module 102, more than one camera and lighting module 104, and/or more than one tote module 106. For example, the station 100 as shown in FIG. 1 may be illustrative of a left-handed station, where the boxes 112 arrive at a left hand side of the station 100. In some instances, the frame 122 may be disposed over a second station, such as a right-handed station, where the boxes arrived at the right-hand side of the second station. Here, the first station and the second station may be placed back to back, for example. Additionally, in some instances, each of the stations may include their own respective case module 102, camera and lighting module 104, and tote module 106. However, in some instances, at least some of the sensor(s) coupled to the frame 122 may be shared across the stations.

The remote computing resource(s) 140 may be implemented as one or more servers and may, in some instances, form a portion of a network-accessible computing platform implemented as a computing infrastructure of processors, storage, software, data access, etc. that is maintained and accessible via a network such as the Internet. The remote computing resource(s) 140 does not require end-user knowledge of the physical location and configuration of the system that delivers the services. Common expressions associated with the remote computing resource(s) 140 include "on-demand computing", "software as a service (SaaS)", "platform computing", "network-accessible platform", "cloud services", "data centers", etc. However, in some instances, the remote computing resource(s) 140 may be located within a same environment as the station 100.

As used herein, a processor, such as the processor(s) 108 and/or the processor(s) 142, may include multiple processors and/or a processor having multiple cores. Further, the processor(s) 108 and/or the processor(s) 142 may comprise one or more cores of different types. For example, the processor(s) 108 and/or the processor(s) 142 may include application processor units, graphic processing units, and so forth. In one implementation, the processor(s) 108 and/or the processor(s) 142 may comprise a microcontroller and/or a microprocessor. The processor(s) 108 and/or the processor(s) 142 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) 142 may possess its own local memory, which also may store program components, program data, and/or one or more operating systems.

Memory, such as the memory 110 and/or the memory 144, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 108 and the processor(s) 142. The memory 110 and/or the memory 144 is an example of non-transitory computer-readable media. The memory 110 and/or the memory 144 may store an operating system and one or more software applications, instructions, programs, and/or data to implement the methods described herein and the functions attributed to the various systems.

Figure 2A:
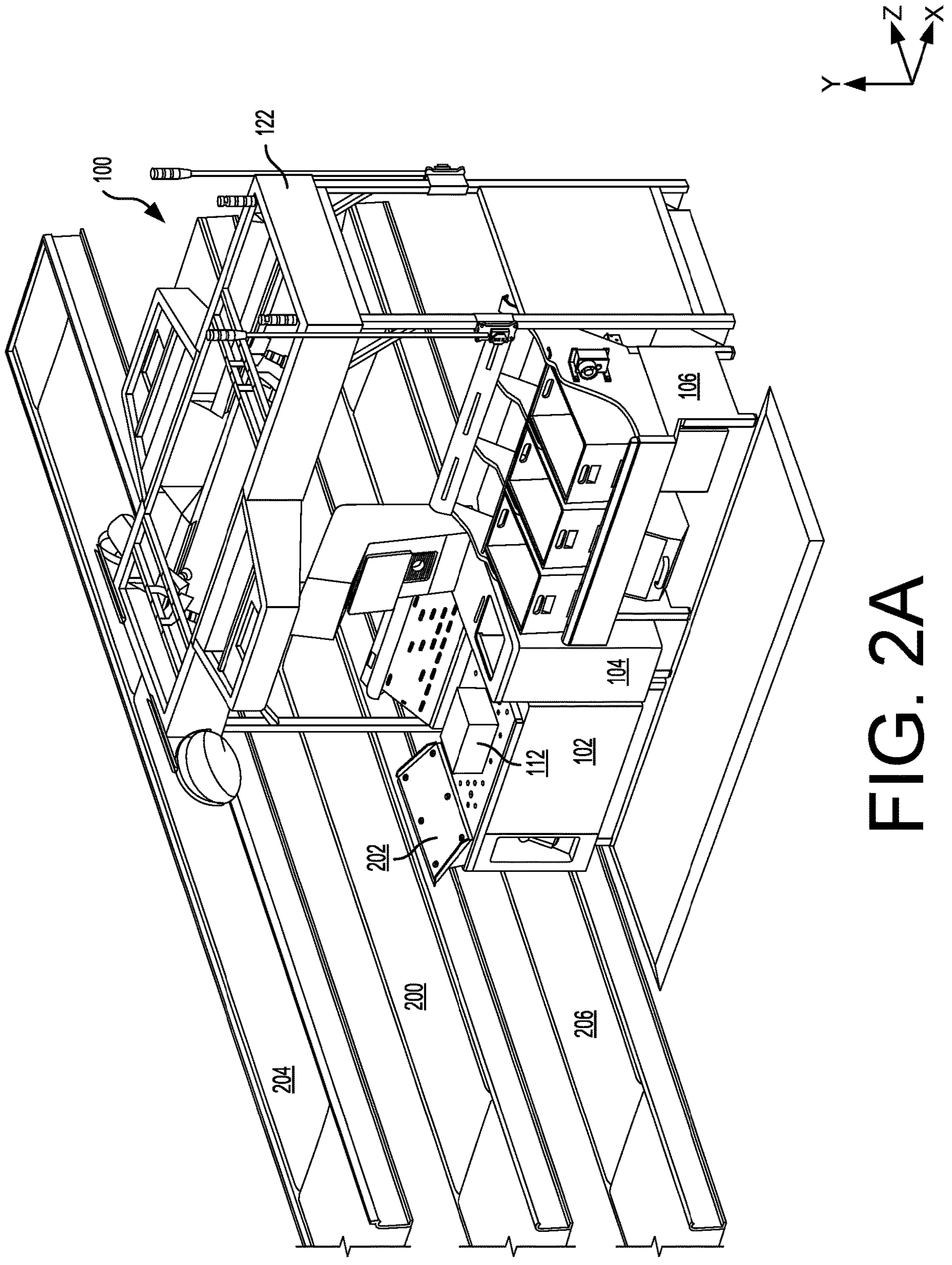
FIGS. 2A-2C illustrate various views of the station of FIG. 1, according to examples of the present disclosure.
Figure 2B:
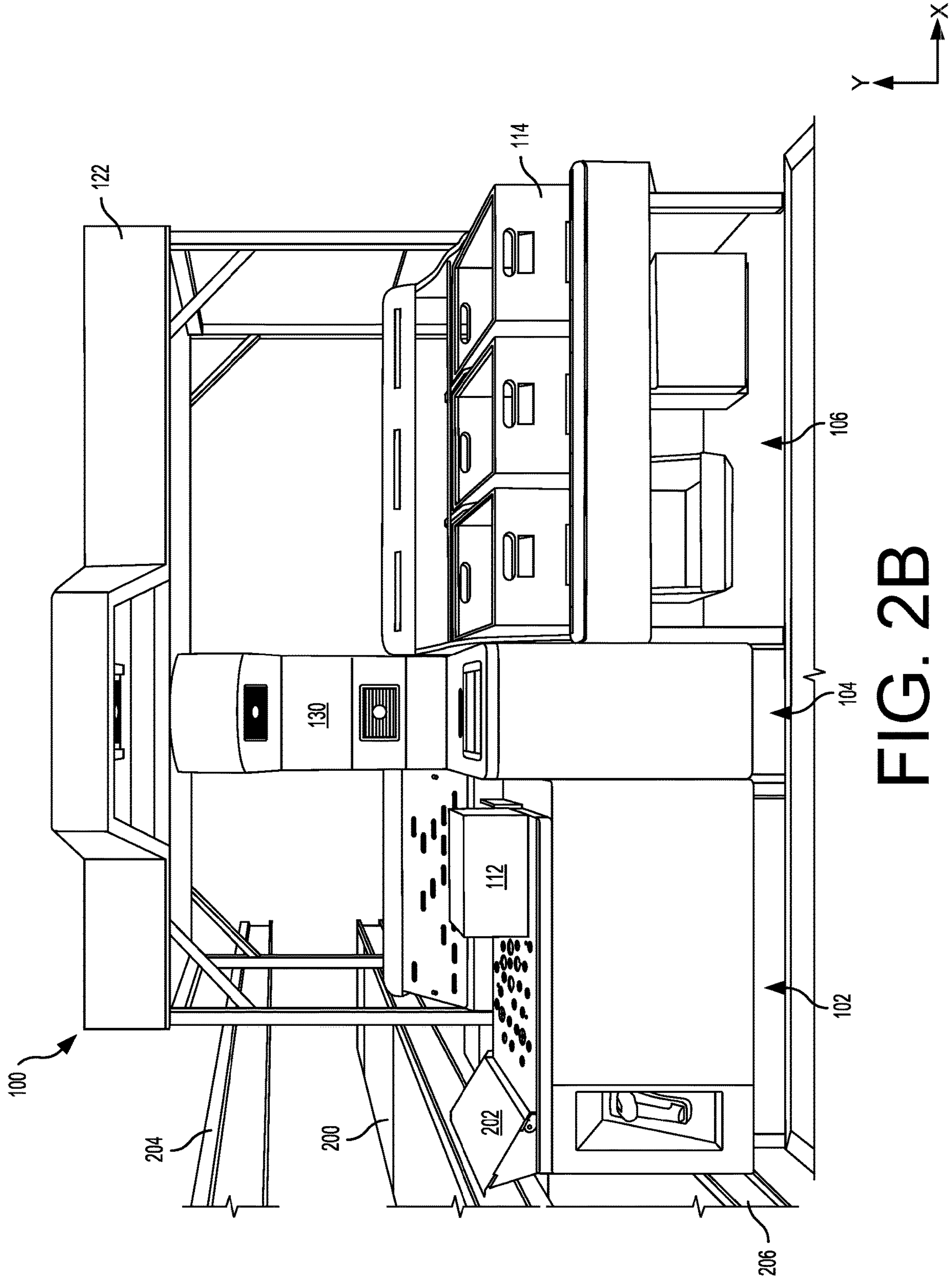
Figure 2C:
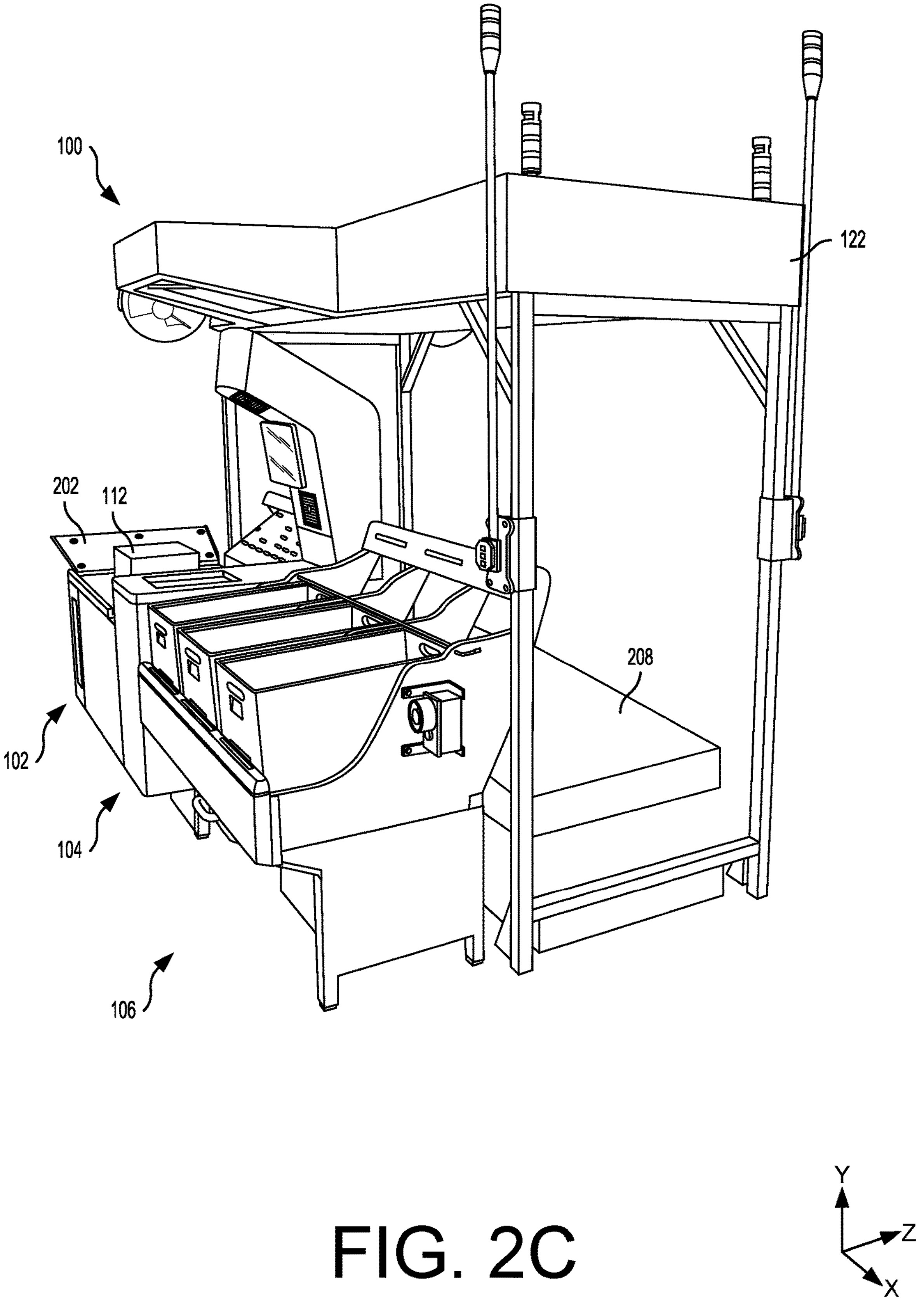

FIGS. 2A-2C illustrate various views of the station 100, according to examples of the present disclosure. In some instances, the station 100, or the case module 102, may receive the boxes 112 from one or more conveyors disposed throughout the environment. For example, the environment may include a first conveyor 200 that conveys the boxes 112 to the case module 102. The first conveyor 200 may also convey the boxes 112 to other case modules 102, or stations 100, disposed about the environment. In some instances, the case module 102 may include a ramp 202 disposed between the first conveyor 200 and the case module 102 to allow the associate to easily maneuver the boxes 112 onto the case module 102.

As introduced above, at the case module 102, the associate may open the box 112 and unpackage the item(s). Once the box 112 is emptied, the associate may place the box 112 onto a second conveyor 204 that resides vertically above the first conveyor 200. The second conveyor 204 may transport the box 112 throughout the environment for discarding, recycling, reuse, etc. The second conveyor 204 may also transport boxes from other stations 100 across the environment.

The environment may also include a third conveyor 206 which, as will be explained herein, may transport the totes 114 throughout the environment once the totes 114 are filled. For example, after filling the totes 114 with the item(s), the associate may move (e.g., push) the totes 114 onto a fourth conveyor 208 connected to the third conveyor 206. In some instances, rather than the associate moving the totes 114 to the fourth conveyor 208, an actuator may extend to push the totes 114 onto the fourth conveyor 208. Once the tote 114 has been moved to the fourth conveyor 208, the fourth conveyor 208 may transport the tote 114 to the third conveyor 206. In some instances, the fourth conveyor 208 may be a component of the station 100. The fourth conveyor 208 may be located on or at a back of the station 100, opposite a front where the associate may be positioned. The third conveyor 206 may also transport totes 114 received from other stations 100 in the environment.

In some instances, the frame 122 may be disposed across (e.g., horizontally and vertically) an entirety of the station 100. For example, the frame 122 may span between the case module 102 and the tote module 106, where the case module 102, the camera and lighting module 104, and the tote module 106 may reside within a footprint of the frame 122. Any number of bars, struts, supports, etc. may form the frame 122, and be coupled to one another via fasteners, welds, etc. As will be explained herein, the sensor(s) 116, the camera(s) 124, and/or the sensor(s) 132 may be coupled to, disposed on, etc. frame 122. Moreover, the lighting element(s) 120, the lighting element(s) 128, and/or the lighting element(s) 134 may be disposed across the frame 122.

Figure 3:
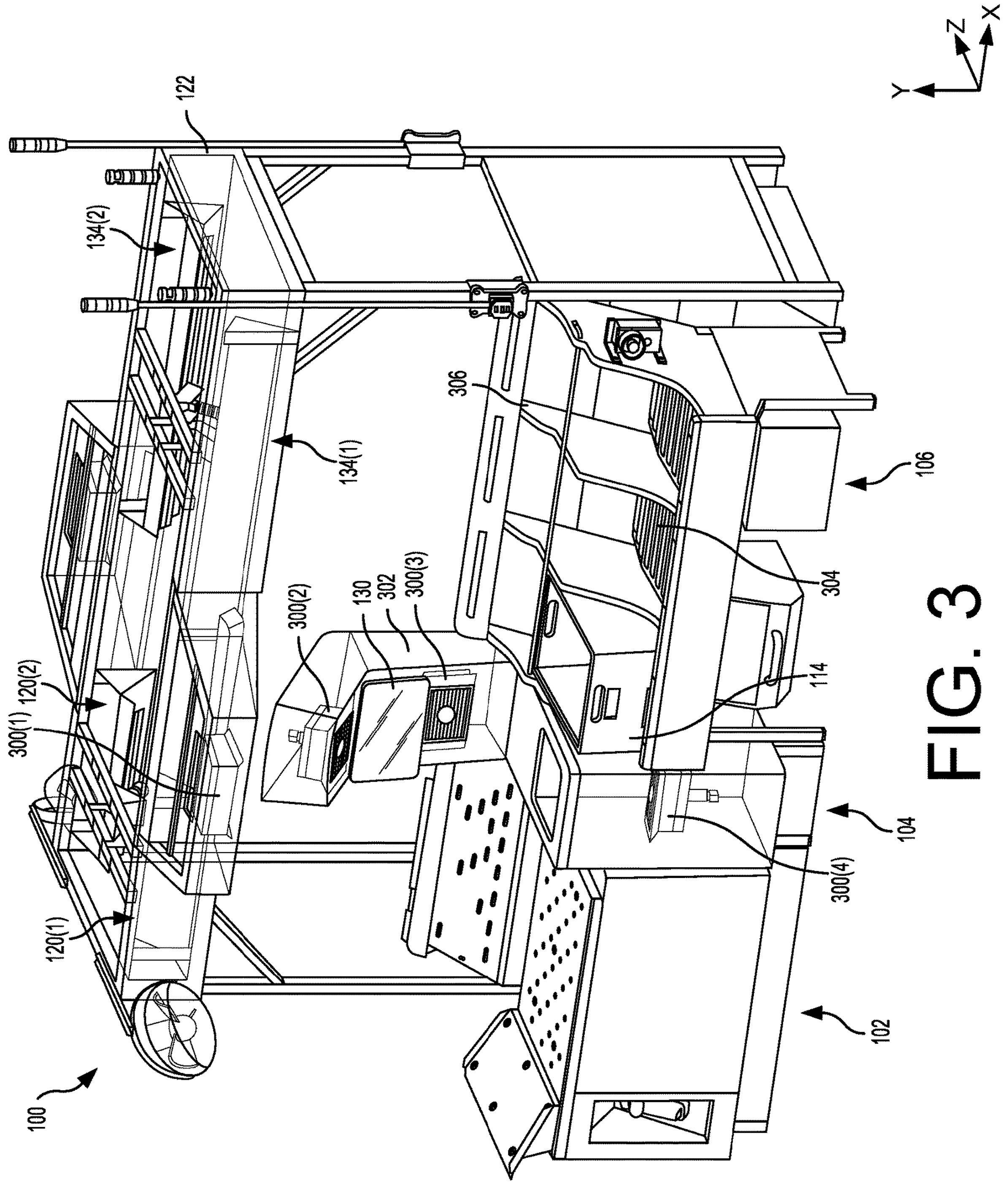
FIG. 3 illustrates a detailed view of the station of FIG. 1, according to examples of the present disclosure.

FIG. 3 illustrates a detailed view of the station 100, according to examples of the present disclosure. The case module 102, the camera and lighting module 104, and the tote module 106 may be compactly positioned adjacent to one another to allow the associate to move the item(s) from the case module 102 to the tote module 106. In some instances, each of the case module 102, the camera and lighting module 104, and the tote module 106 include their own controllers, CPUs, memory, etc. for carrying out their respective operations.

The lighting element(s) 120 of the case module 102 may be disposed vertically above the case module 102 and coupled to the frame 122. In some instances, the lighting element(s) 120 may include a first lighting element 120(1) oriented towards a case module of another station (e.g., located behind the station 100 in the Z-direction), and a second lighting element 120(2) orientated towards the case module 102. The lighting element(s) 120, however, may be coupled to a frame of the case module 102 to illuminate the boxes 112 from the side. The sensor(s) 116 may be coupled to the frame 122 and oriented towards the case module 102 and the boxes 112.

The lighting element(s) 134 may also be disposed vertically above the tote module 106 and oriented towards the totes 114. In some instances, the lighting element(s) 134 may include a first lighting element 134(1) and a second lighting element 134(2). In some instances, the second lighting element 134(2) may be oriented towards the tote module 106, while the first lighting element 134(1) may be oriented towards a case module of another station (e.g., located behind the station 100 in the Z-direction). The sensor(s) 132 may be coupled to the frame 122 and oriented towards the totes 114. The lighting element(s) 134, however, may be disposed on a frame of the tote module 106.

The camera and lighting module 104 may include a first camera and lighting subassembly 300(1), a second camera and lighting subassembly 300(2), a third camera and lighting subassembly 300(3), and a fourth camera and lighting subassembly 300(4). In some instances, each of the camera and lighting subassemblies 300 may include a camera 124 and a lighting element 128. Details of the camera and lighting subassemblies 300 are discussed herein, however, the first camera and lighting subassembly 300(1) may be mounted to the frame 122 and oriented in a first direction/orientation, the second camera and lighting subassembly 300(2) may be disposed in a housing 302 of the camera and lighting module 104 and oriented in a second direction/orientation, the third camera and lighting subassembly 300(3) may be disposed in the housing 302 of the camera and lighting module 104 and oriented in a third direction/orientation, and the fourth camera and lighting subassembly 300(4) may be disposed in the housing 302 of the camera and lighting module 104 and oriented in a fourth direction/orientation.

In some instances, each of the camera and lighting subassemblies 300 include a housing that at least partially defines baffles for reducing glare of the lighting element(s) 128. The housing may define a channel in which the camera 124 is at least partially disposed, and the lighting element(s) 128 may emit light through the baffles. The camera(s) 124 may be coupled to the housing 302 of the camera and lighting subassemblies 300.

The camera and lighting module 104 may also include the display 130 for presenting information associated with the item(s) being scanned and deposited into the totes 114. The display 130 may be mounted to the housing 302. In some instances, the display 130 may be located vertically below the first camera and lighting subassembly 300(1) and the second camera and lighting subassembly 300(2), but vertically above the third camera and lighting subassembly 300(3) and the fourth camera and lighting subassembly

300(4). The display 130 may represent any suitable display (e.g., LCD, LED, OLED, etc.).

The tote module 106 may include rollers 304 for maneuvering the totes 114 from the tote module 106 to the fourth conveyor 208, for example. In some instances, the rollers 304 may define a rolling surface of the tote module 106 on which the totes 114 are disposed. The rolling surface may represent a counter, platform, table, etc. on which the totes 114 are disposed. After the totes 114 become full, the totes 114 may be pushed, for example, onto the fourth conveyor 208. In some instances, tote dividers 306 may be disposed between the totes 114 on the tote module 106.

Figure 4:
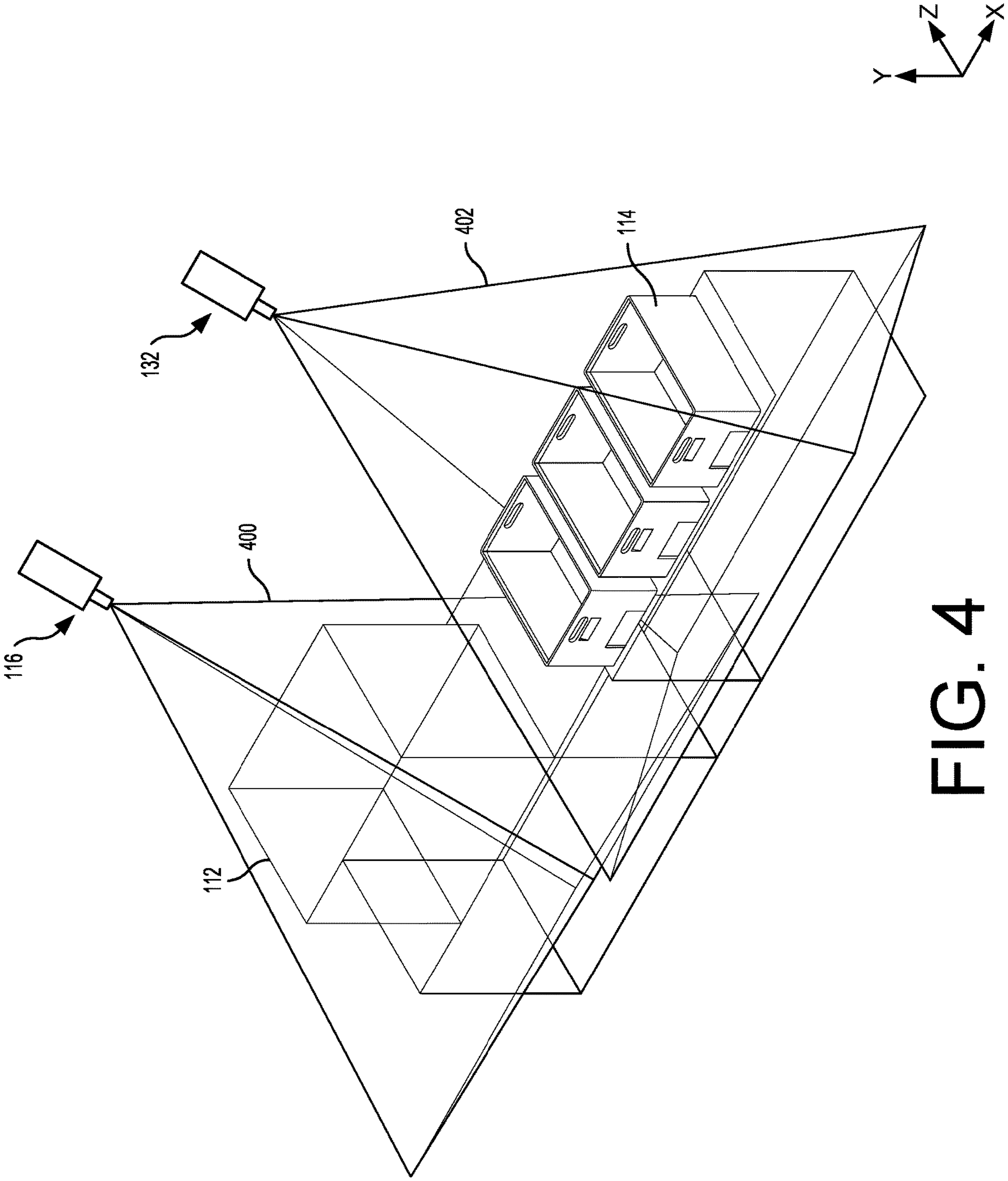
FIG. 4 illustrates example fields of view of sensor(s) of the station of FIG. 1, according to examples of the present disclosure.

FIG. 4 illustrates fields of view (FoV) of the sensor(s) 116 and the sensor(s) 132, according to examples of the present disclosure. As introduced above, the sensor(s) 116 may be disposed overhead of the case module 102 and the boxes 112 disposed on the case module 102, and the sensor(s) 132 may be disposed overhead of the tote module 106 and the totes 114. The sensor(s) 116 and/or the sensor(s) 132 may be communicatively connected to components of the case module 102, the tote module 106, and/or components of the station 100. For example, the processor(s) 108 may receive sensor data 118 from the sensor(s) 116 and/or the sensor(s) 132.

The sensor(s) 116 may have a FoV 400 that may accommodate boxes of a threshold size (e.g., 4'×4'×4'). Within the FoV 400, the sensor(s) 116 may capture sensor data 118 (or image data) associated with an identifier (e.g., barcode) of the boxes 112. The associate may manipulate the boxes 112 on the case module 102 in order for the identifier to be read. Once read, for example, the display 130 may present information associated with contents of the box 112 (e.g., quantity of item(s), type of item(s), and so forth). The first lighting element 120(1) and/or the second lighting element 120(2) may also illuminate the FoV 400. For example, the first lighting element 120(1) and/or the second lighting element 120(2) may include a distribution field that at least partially overlaps with the FoV 400. In some instances, the first lighting element 120(1) may illuminate a FoV of a sensor that images boxes of a second station, while the second lighting element 120(2) may illuminate a FoV of a sensor that images boxes of the station 100.

Similarly, the sensor(s) 132 may be disposed overhead of the tote module 106 and the totes 114. The sensor(s) 132 may have a FoV 402 that may accommodate viewing the totes 114, and identifiers on the tote 114. In some instances, the FoV 402 may be of a similar or different size as compared to the FoV 400. Within the FoV 402, the sensor(s) 132 may capture sensor data 118 (or image data) associated with an identifier (e.g., barcode) of the totes 114. For example, the identifier may be located on a top surface (e.g., edge, lip, flange, etc.) for being read by the sensor(s) 132. Additionally, the sensor(s) 132 may generate data associated with where the item(s) are placed, such as within which tote 114 the item(s) are deposited. Doing so allows for the item(s) to be associated with a particular tote 114, which enables the item(s) to be tracked throughout the environment (e.g., by reading the identifier of the tote 114). The display 130 may present information associated with the tote 114 in which the item is deposited. The second lighting element 134(2) may illuminate the FoV 402. For example, the second lighting element 134(2) may include a distribution field that at least partially overlaps with the FoV 402.

The FoV 400 and the FoV 402 may be modified, adjusted, or otherwise manipulated in order to properly identify the boxes 112, the totes 114, the item(s), and so forth. The sensor(s) 116 and the sensor(s) 132 may represent any suitable sensor(s), such as cameras, LIDAR, weight sensors, proximity sensors, etc.

Figure 5A:
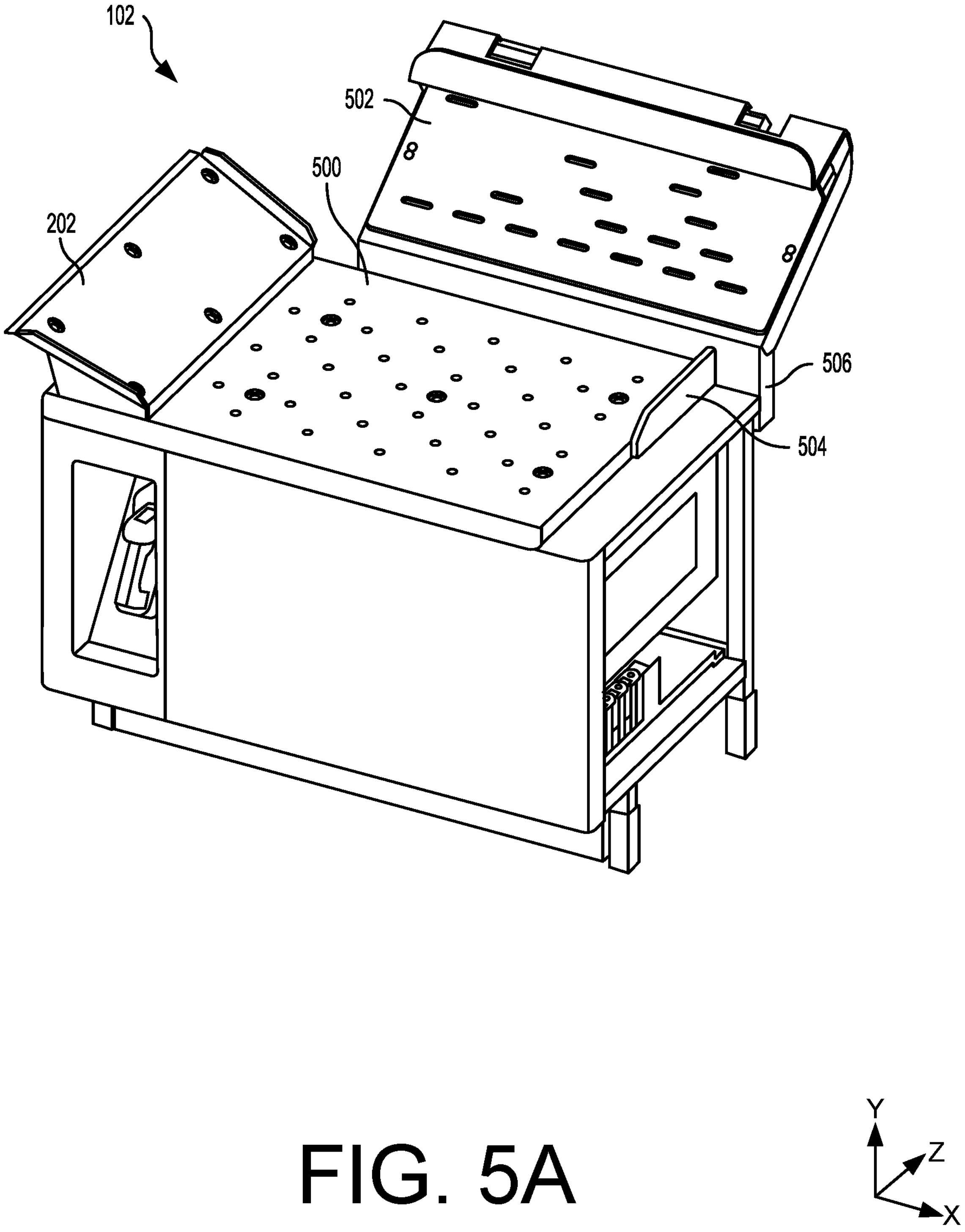

FIGS. 5A and 5B illustrate the case module 102, according to examples of the present disclosure. FIG. 5A illustrates an assembled view of the case module 102, whereas FIG. 5B illustrates a partially exploded view of the case module 102.

The case module 102 includes the ramp 202, a platform 500, a backstop 502, and an endplate 504. The ramp 202, the platform 500, the backstop 502, and the endplate 504 may couple to a housing 506 of the case module 102. The ramp 202 connects the first conveyor 200 to the platform 500, for example, to enable the boxes 112 to be transferred from the first conveyor 200 to the platform 500. The platform 500 may include a plurality of ball bearings to enable the associate to maneuver (e.g., slide, push, pull, etc.) the boxes 112 on the platform 500. The backstop 502 provides a barrier that enables the associate to maneuver the boxes 112 (e.g., flip) without the boxes 112 falling off the case module 102. The backstop 502 may be angled or sloped towards the platform 500 to divert the boxes 112 towards the platform 500. The endplate 504 provides a stopping point for the boxes 112 to avoid the boxes contacting the camera and lighting module 104, and/or reduces a pinch/crush hazard between the boxes 112 and the camera and lighting module 104.

In some instances, the backstop 502 may be removed to provide access to the fourth conveyor 208. For example, in some instances, the totes 114 may become jammed, stuck, etc. from the fourth conveyor 208 to the third conveyor 206. The backstop 502 may be removed from the housing 506 to provide access to the fourth conveyor 208 to allow the associate to unblock, clear, etc. the totes 114. For example, the associate may access the fourth conveyor 208 and/or totes 114 on the fourth conveyor 208 via an opening 508 defined in the housing 506. A third lighting element 120(3) may be disposed on the housing 506, and illuminate the boxes 112 from the side, for example. In some instances, the third lighting element 120(3) may be directed towards the platform 500 (e.g., downward). The third lighting element 120(3) may be oriented in a different direction as compared to the first lighting element 120(1) and the second light element 120(2) coupled to the frame 122.

In some instances, an entirety of the ramp 202, the platform 500, and/or the backstop 502 may be within the FoV 400 the sensor(s) 116. The FoV 400 may extend a certain height (e.g., 4 feet) above the platform 500, for example, to enable the sensor(s) 116 to read the identifier(s) on the side, top, etc. of the boxes 112. The case module 102, or components thereof (e.g., the ramp 202) may have a surface finish that reduces glare. For example, glare may impact the ability of the sensor(s) 116 to read the identifier(s) on the boxes 112 and/or may be bothersome or uncomfortable for the associate. The platform 500 may have a matte or anti-glare surface finish.

The case module 102 may include a tray 510 having one or more computing components 512 (e.g., 6 U). The computing components 512 may communicatively couple to other computing components of the case module 102, such as the lighting element(s) 120, the sensor(s) 116, etc., as well as computing components of the camera and lighting module 104, the tote module 106, and so forth. The case module, or the backstop 502, may also have a shield 514 that blocks the light from the third lighting element 120(3).

Figure 6B:
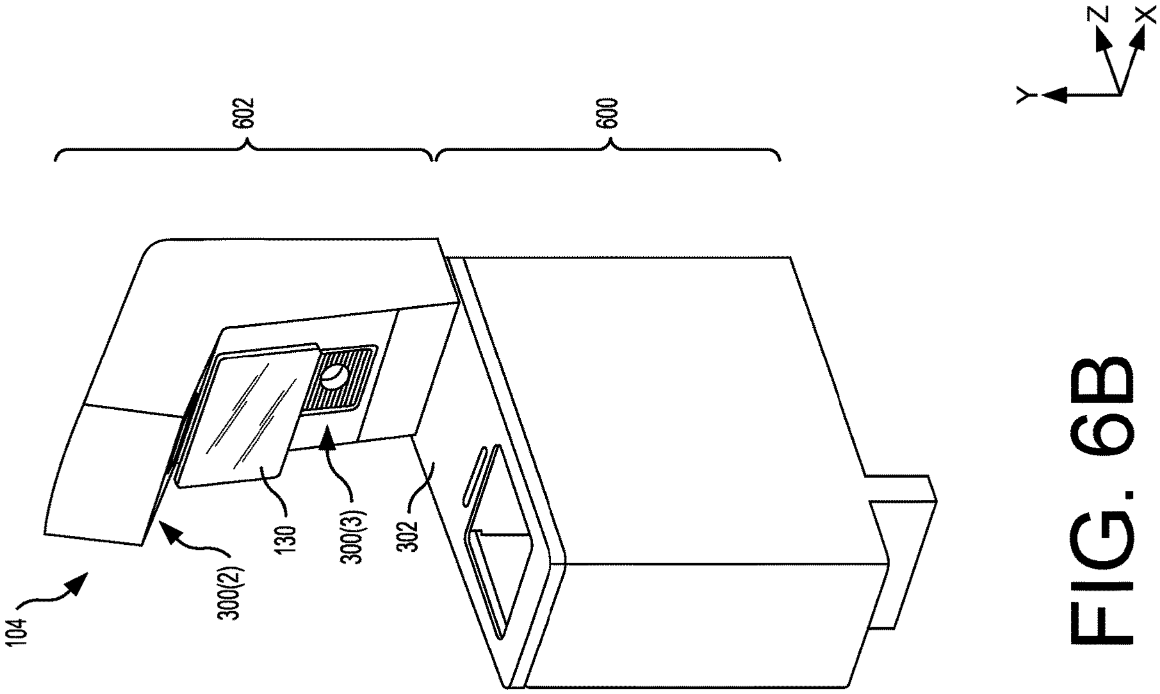
FIGS. 6A and 6B illustrate an example camera and lighting module of the station of FIG. 1, according to examples of the present disclosure.
Figure 6A:
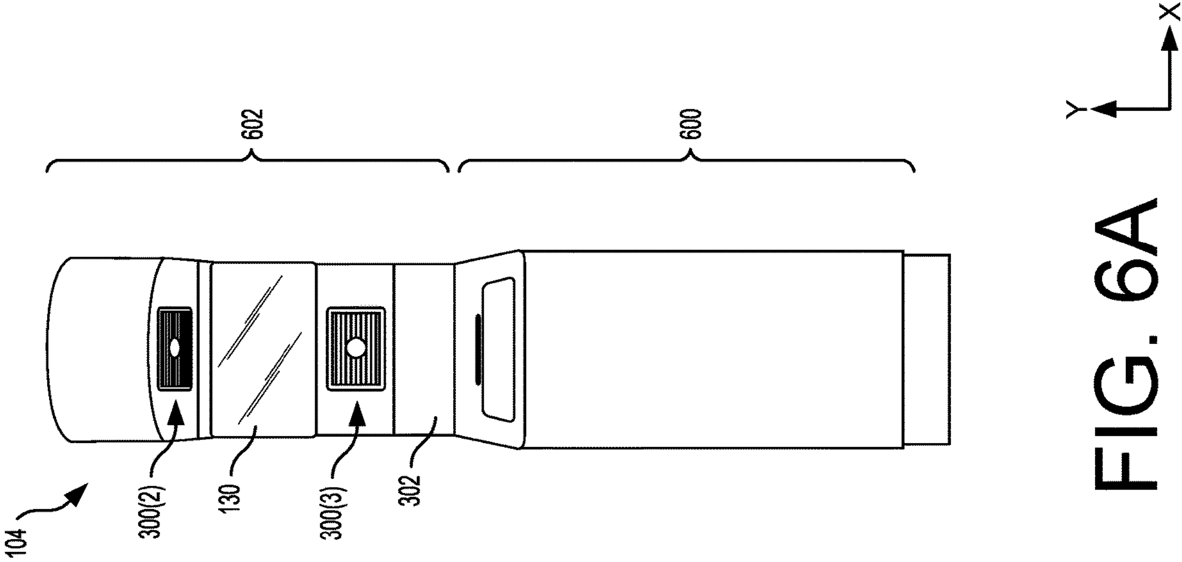

FIGS. 6A and 6B illustrate the camera and lighting module 104, according to examples of the present disclosure. The camera and lighting module 104 may include the camera(s) 124 arranged to read the item(s). Additionally, as discussed above, the camera and lighting module 104 may include the camera and lighting subassemblies 300, where each of the camera and lighting subassemblies 300 include a camera 124 and a lighting element(s) 128.

The camera and lighting module 104 includes the housing 302, which may have a bottom portion 600 (e.g., half, section, segment, etc.) and a top portion 602 (e.g., half, section, segment, etc.). The first camera and lighting subassembly 300(1) may be disposed on the frame 122, the second camera and lighting subassembly 300(2) may be disposed in the top portion 602, the third camera and lighting subassembly 300(3) may be disposed in the top portion 602, and the fourth camera and lighting subassembly 300(4) may be disposed in the bottom portion 600. Additionally, the display 130 may be disposed on the top portion 602, between the second camera and lighting subassembly 300(2) and the third camera and lighting subassembly 300(3). Although the camera and lighting module 104 is described as including four of the camera and lighting subassemblies 300, more than or less than four of the camera and lighting subassemblies 300 may be included. Each of the camera and lighting subassemblies 300 has a FoV, which may at least partially overlap, for creating a volume, area, or space in which the identifier on the item(s) may be read. As shown, the top portion 602 may at least partially hang or extend over the bottom portion 600. In some instances, because some of the camera and lighting subassemblies 300 are oriented towards the bottom portion 600, the bottom portion may be anti-reflective coatings to reduce reflections. For example, the fourth camera and lighting subassembly 300(4) may be disposed beneath piece of glass, where the glass may have anti-reflective coatings.

Additional details of the camera and lighting module 104, or components thereof, to read the item(s), for example, are described in U.S. patent application Ser. No. 17/404,519 filed Aug. 17, 2021, the entirety of which is herein incorporated by reference.

Figure 7:
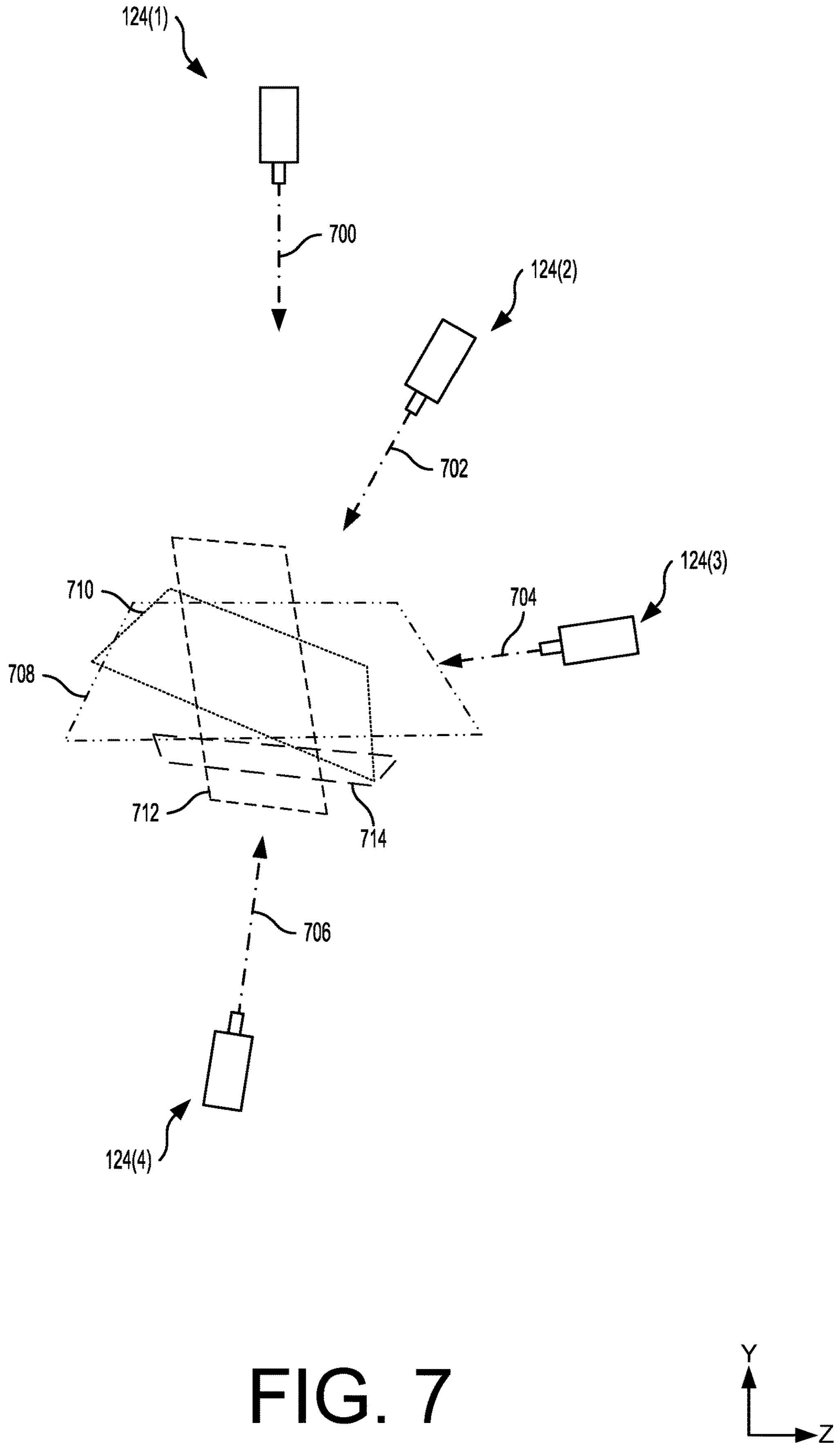
FIG. 7 illustrates example sensor(s) of the camera and lighting module of FIGS. 6A and 6B, according to examples of the present disclosure.

FIG. 7 illustrates the camera(s) 124 of the camera and lighting module 104, according to examples of the present disclosure. The first camera 124(1) may be a component of the first camera and lighting subassembly 300(1), coupled to the frame 122, and oriented in a first direction 700, the second camera 124(2) may be a component of the second camera and lighting subassembly 300(2) and oriented in a second direction 702 different than the first direction, the third camera 124(3) may be a component of the third camera and lighting subassembly 300(3) and oriented in a third direction 704 different than the second direction, and the fourth camera 124(4) may be a component of the fourth camera and lighting subassembly 300(4) and oriented in a fourth direction 706 different than the third direction. The first direction 700 may be towards a ground of the environment, or towards the bottom portion 600, the second direction 702 may be towards the ground, but tilted towards the front of the station 100, the third direction 704 may be towards the front of the station 100, and the fourth direction 706 may be towards the top portion 602, or the frame 122.

The first camera 124(1) may have a first FoV 708, the second camera 124(2) may have a second FoV 710, the third camera 124(3) may have a third FoV 712, and the fourth camera 124(4) may have a fourth FoV 714. In some instances, the first FoV 708, the second FoV 710, the third FoV 712, and the fourth FoV 714 may at least partially overlap. As shown, the first FoV 708 may be a substantially horizontal FoV, the second FoV 710 may be a horizontal and vertical FoV, the third FoV 712 may be substantially vertical FoV, and the fourth FoV 714 may be a substantially horizontal FoV. In some instances, the fourth FoV 714 may be narrower as compared to the first FoV 708, the second FoV 710, and/or the third FoV 712 to read smaller identifier(s) on the item. The different FoVs of the camera(s) 124 may assist is reading the identifier on the item(s), at different orientations, positions, etc. of the item(s) as the item(s) pass over, across, etc. the camera and lighting module 104. For example, the first FoV 708, the second FoV 710, the third FoV 712, and/or the fourth FoV 714 may be sized to capture various identifier(s) of the item. Although certain sizes, orientations, etc. of the first FoV 708, the second FoV 710, the third FoV 712, and/or the fourth FoV 714 are shown, the first FoV 708, the second FoV 710, the third FoV 712, and/or the fourth FoV 714 may have different sizes, orientations, etc. differently than shown.

The lighting element(s) 128 may illuminate a distribution field that at least partially overlap with the FoVs of the camera(s) 124, respectively. For example, the lighting element of the first camera and lighting subassembly 300(1) may illuminate the first FoV 708, the lighting element of the second camera and lighting subassembly 300(2) may illuminate the second FoV 710, the lighting element of the third camera and lighting subassembly 300(3) may illuminate the third FoV 712, and the lighting element of the fourth camera and lighting subassembly 300(4) may illuminate the fourth FoV 714.

Figure 8:
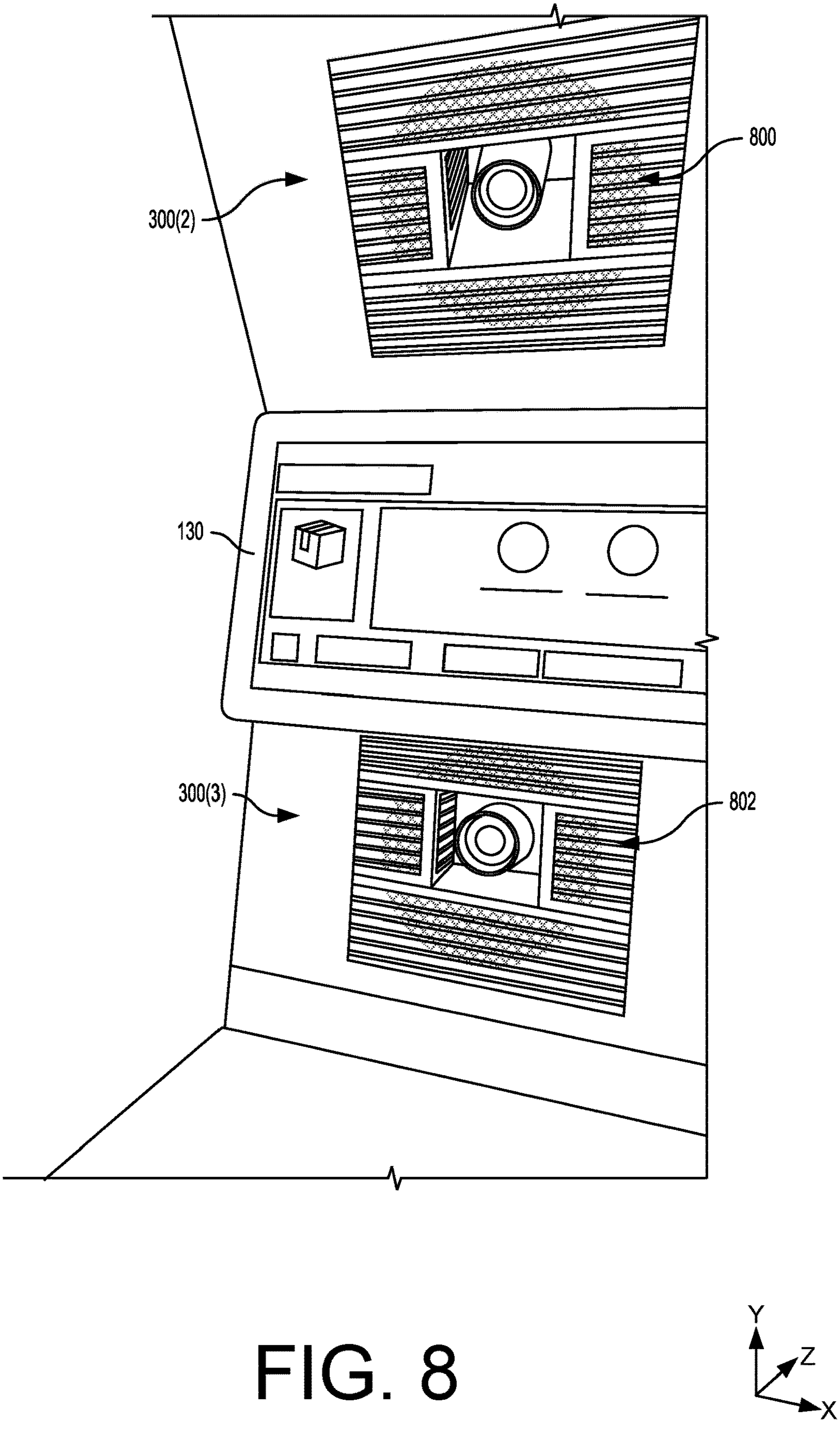
FIG. 8 illustrates example lighting elements of the camera and lighting module of FIGS. 6A and 6B, according to examples of the present disclosure.

FIG. 8 illustrates a partial view of the camera and lighting module 104, according to examples of the present disclosure. More particularly, FIG. 8 illustrates the second camera and lighting subassembly 300(2) and the third camera and lighting subassembly 300(3). The second camera and lighting subassembly 300(2) includes the second camera 124(2) and lighting element disposed around the second camera 124(2). For example, the lighting element may represent a ring light (e.g., ring LED) disposed around the second camera 124(2) that outputs light 800. Similarly, the third camera and lighting subassembly 300(3) includes the third camera 124(3) and lighting element (e.g., ring LED) disposed around the third camera 124(3) that outputs light 802. The first camera and lighting subassembly 300(1) and the fourth camera and lighting subassembly 300(4) may include similar lighting elements.

The camera and lighting subassemblies, as discussed in detail herein with regard to FIGS. 9A-9D, may include a housing having one or more baffles. The lighting elements may be disposed beneath the baffles and the baffles may reduce a glare of the lighting elements to the associate. The housing may include a channel through which the camera(s) 124 are disposed, and the lighting elements may be arranged around the camera(s) 124, respectively.

Figure 9A:
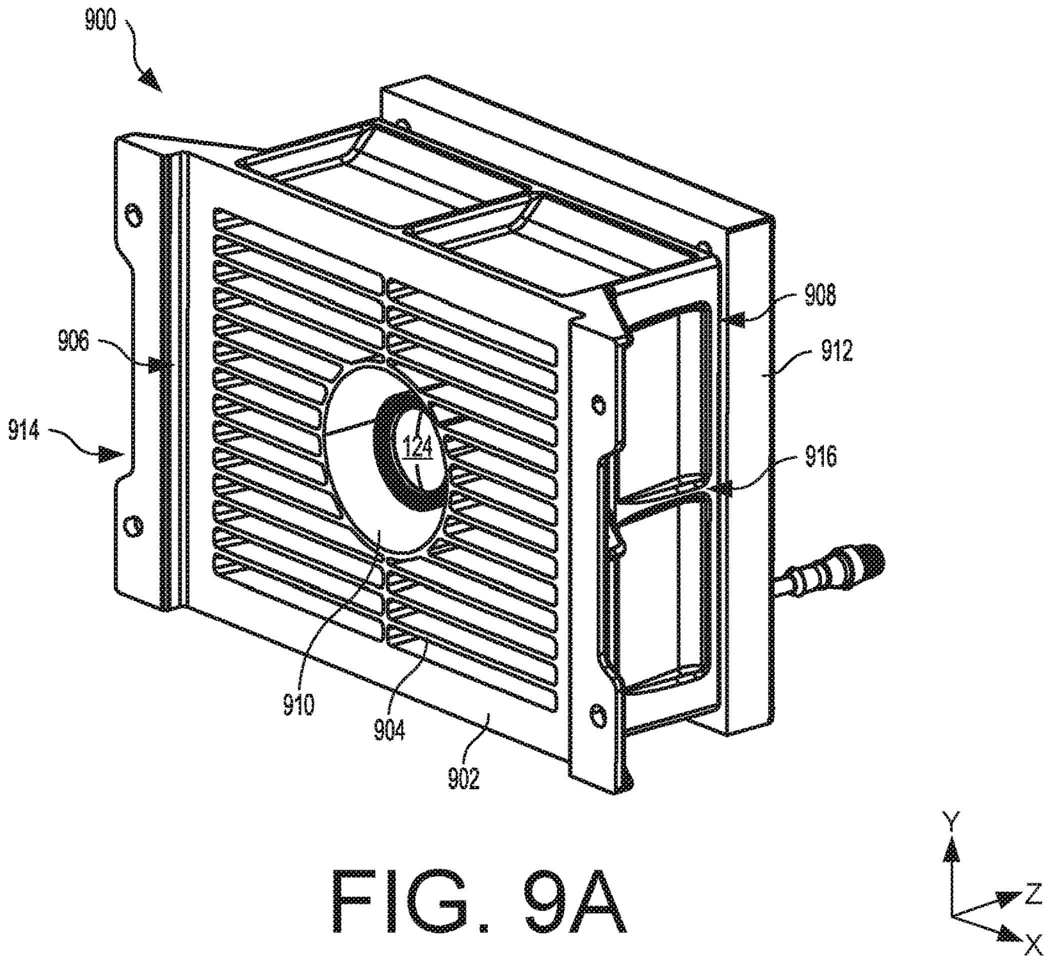
FIGS. 9A-9D illustrate various views of a camera and lighting subassembly of the camera and lighting module of FIGS. 6A and 6B, according to examples of the present disclosure.
Figure 9B:
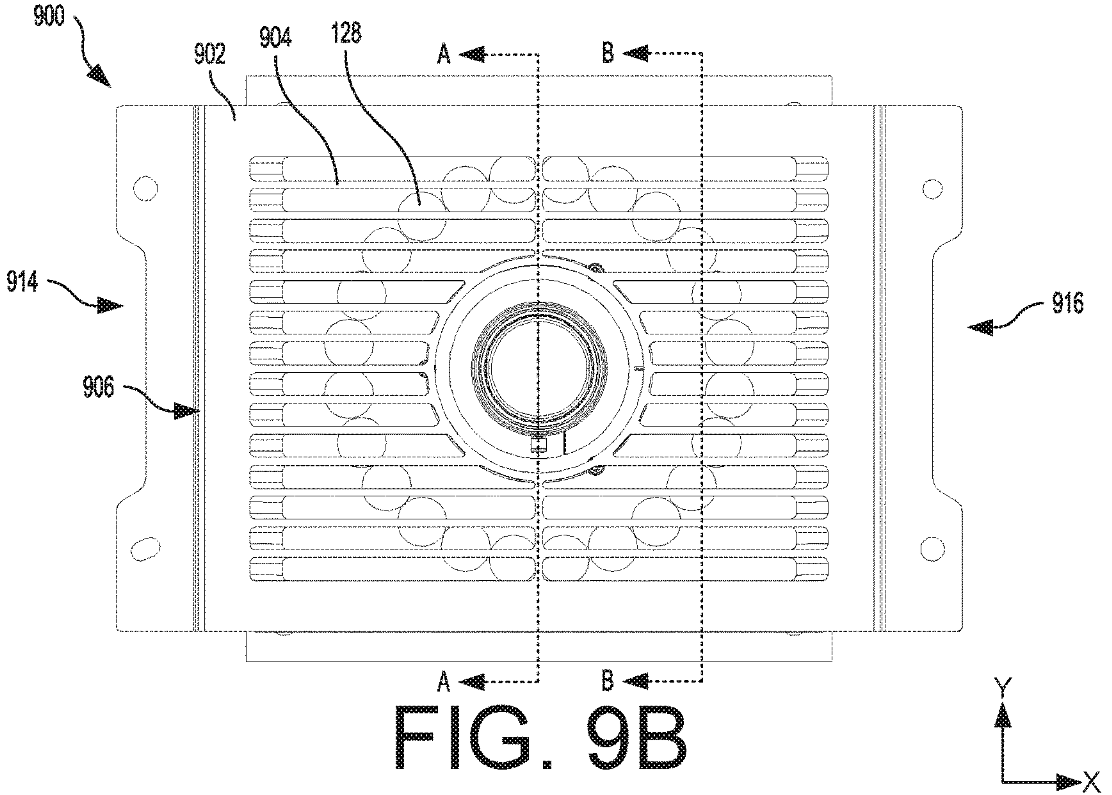
Figure 9D:
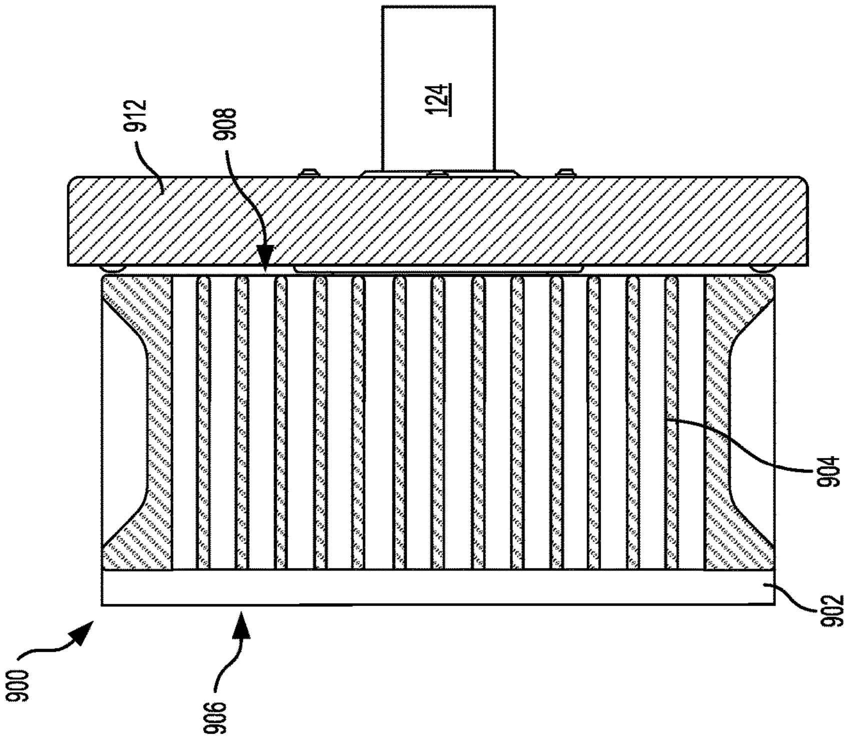
Figure 9C:
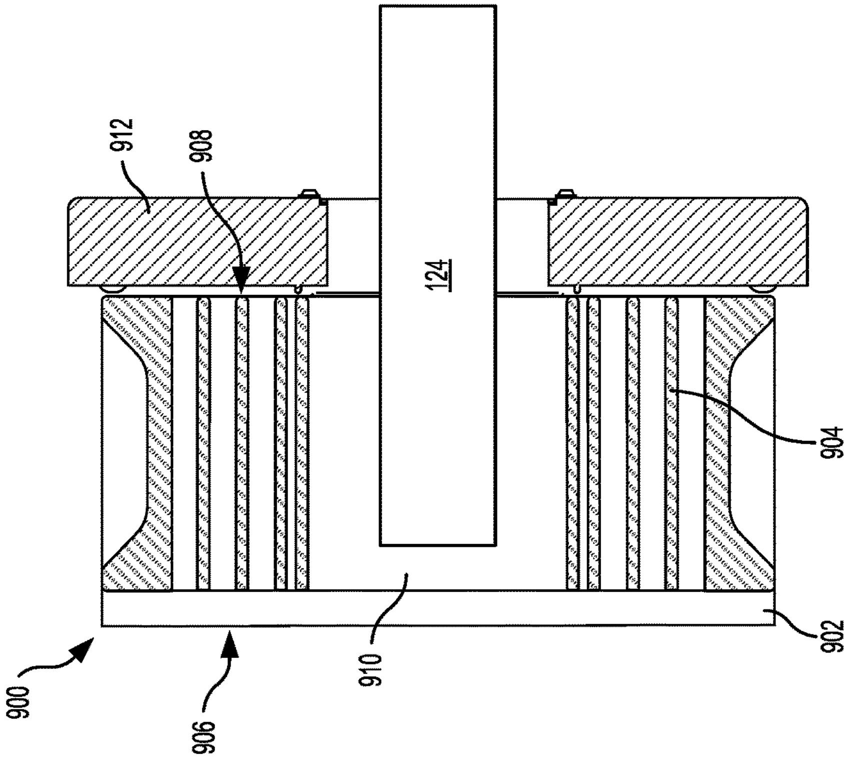

FIGS. 9A-9D illustrate details of a camera and lighting subassembly 900, according to examples of the present disclosure. FIG. 9A illustrates a perspective view of the camera and lighting subassembly 900, FIG. 9B illustrates a front view of the camera and lighting subassembly 900, FIG. 9C illustrates a first cross-sectional view of the camera and lighting subassembly 900, taken along line A-A of FIG. 9B, and FIG. 9D illustrates a second cross-sectional view of the camera and lighting subassembly 900, taken along line B-B of FIG. 9B. The camera and lighting subassembly 900 may be representative of any of the camera and lighting subassemblies 300(1)-(4) discussed herein.

The camera and lighting subassembly 300 includes a housing 902 (e.g., frame, bracket, etc.) that forms one or more baffles 904 (e.g., louvers). The housing 902 may including a front 906 and a back 908, opposite the front 906.

The housing 902 also defines a channel 910 that extends between the front 906 and the back 908. The camera 124 may be at least partially disposed through or within the channel 910, for imaging the item(s). The housing 902 may couple to the frame 122 and/or the camera and lighting module 104 (e.g., the housing 302) for disposing the camera(s) 124, for example, at their respective orientations.

The lighting element(s) 128 may be disposed on a printed circuit board 912 (PCB) that couples to the back 908. The PCB 912 may include a channel for accommodating the camera 124. As shown in FIG. 9B, for example, the lighting element(s) may be arranged in a ring around the camera 124. Any number of the light element(s) 128 (e.g., LEDs) may form the ring (e.g., 24). The lighting element(s) 128 assist in lighting the environment to enable the camera 124 to capture sensor data 118 (or the image data 126) of the item. In some instances, the PCB 912 may include the lighting elements 128 (i.e., the light ring), a housing, etc.

The baffles 904 may extend horizontally across the housing 902, from a first side 914 to a second side 916. In some instances, the baffles 904 may be oriented in the same direction as one another, or may be oriented in a different direction as one another. A spacing or gap distance is disposed between adjacent baffles 904 to permit light from the lighting element(s) 128 to shine into the environment. However, the baffles 904 may be angled, titled, etc. to reduce and/or eliminate glare experienced by the associate. For example, as the associate may be working at the station 100, and facing or orientated towards the lighting element(s) 128, the baffles 904 may serve to reduce an amount of glare experienced by the associate. Although a particular orientation or disposition of the baffles 904 are shown, other variations are envisioned. For example, although the baffles 904 are shown as extending horizontally (e.g., from the first side 914 to the second side 916), in some instances, the baffles 904 may additionally or alternatively extend vertically (e.g., in the Y-direction). In some instances, a depth of the baffles 904 (e.g., in the Z-direction), a spacing between the baffles 904 (e.g., in the Y-direction) and/or an orientation of the camera and lighting subassemblies may be optimized to minimize glare experienced by the associates and/or optimized to maximize an amount of light to illuminate the items.

In some instances, the baffles 904 may include a planar (e.g., flat) structure, or may include other structures (e.g., sawtooth, ridges, grooves, etc.). In some instances, the baffles 904 may be different than one another, between the housings 902. For example, for the first camera and lighting subassembly 300(1), the baffles 904 of the housing 902 may include a first angle, tilt, etc., while the baffles 904 of the housing 902 for the second camera and lighting subassembly 300(2) may include a second angle, tilt, etc. As such, depending upon the location of the camera and lighting subassembly 300, the baffles 904 may be different.

The baffles 904 may also be made of a material, or include a surface finish, which reduces the reflections. In some instances, the lighting element(s) 128 may be polarized, non-polarized, etc. Whether the lighting element(s) 128 are polarized may be based on a location of the camera and lighting subassembly 300 at the station 100.

Figure 10:
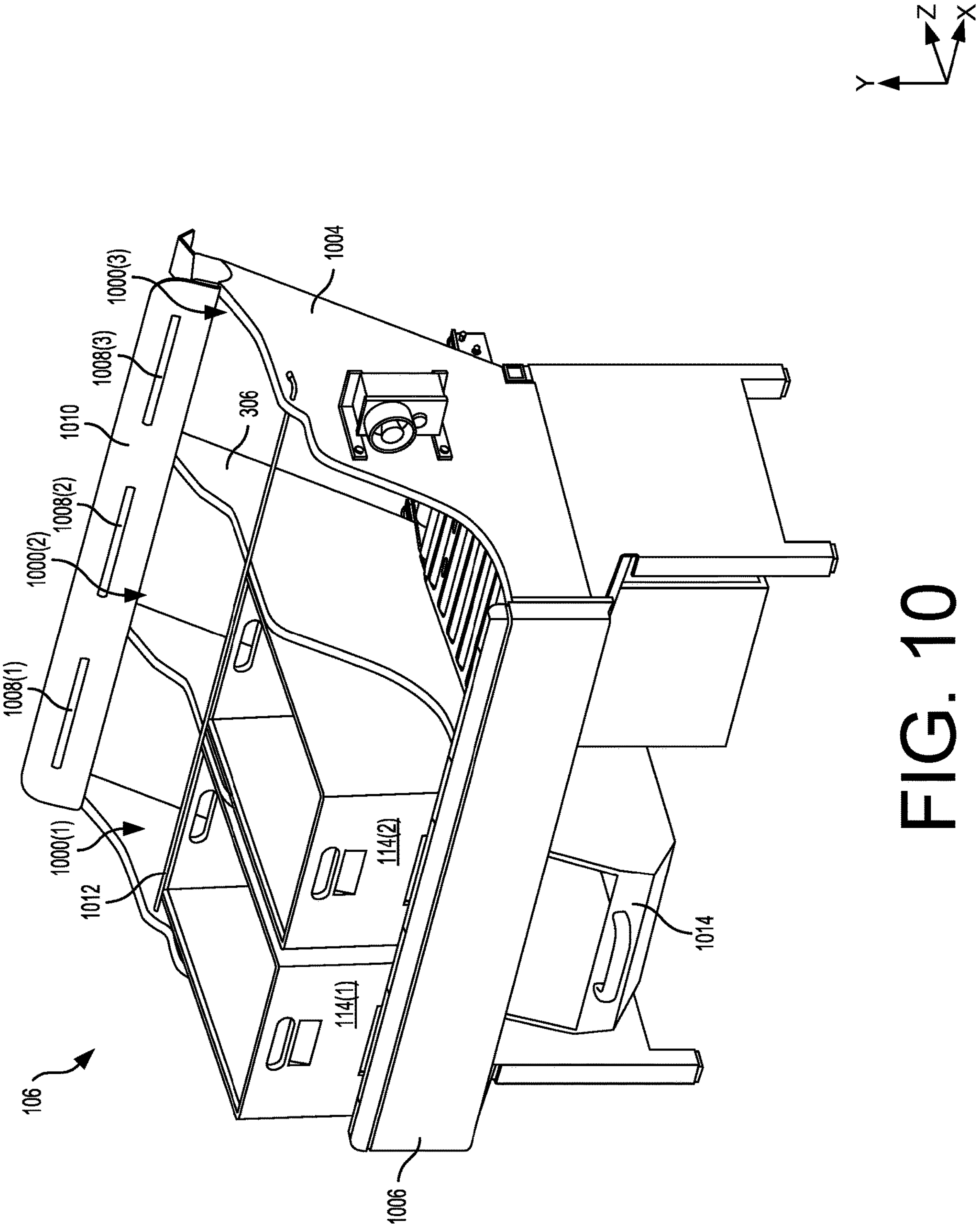
FIG. 10 illustrates an example tote module of the station of FIG. 1, according to examples of the present disclosure.

FIG. 10 illustrates details of the tote module 106, according to examples of the present disclosure. As introduced above, the tote module 106 is configured to hold, store, receive, etc. one or more totes 114. The totes 114 may be received within tote slots 1000 (e.g., receptacles, etc.) of the tote module 106. For example, the tote module 106 may include three of the tote slots 1000 for receiving three totes 114, respectively. As shown, a first tote 114(1) may reside in a first tote slot 1000(1), a second tote 114(2) may reside in a second tote slot 1000(2), but a tote 114 may not reside in the third tote slot 1000(3). The tote module 106 may include dividers 306 (e.g., walls, partitions, etc.), such as the tote dividers 306, that at least partially separate the tote slots 1000.

The tote module 106 may include a frame 1004 that defines the tote slots 1000, as well as which forms a body, structure, etc., of the tote module 106. Any number of bars, members, struts, etc. may couple to one another to form the frame 1004. The rollers 304 and the dividers 306 couple to the frame 1004.

The totes 114 may reside on the rollers 304 to enable the totes 114 to be moved from the tote slots 1000 to the fourth conveyor 208, for example. For example, once the totes 114 become full, the totes 114 may be pushed onto the fourth conveyor 208. In some instances, the tote slots 1000, or rather the rollers 304, may be slightly angled, pitched, orientated downwards to tilt the totes 114 towards the associate. The tilt of the tote 114 may assist the associate in placing item(s) into the totes 114, and may also seat the totes 114 in the tote slots 1000. For example, the tilt of the tote slots 1000 may prevent the tote 114 inadvertently moving to the fourth conveyor 208. When disposed in the tote slot 1000, the totes 114 may abut a front rail 1006 of the tote module 106. Each of the tote slots 1000 may include respective rollers 304 to maneuver the totes 114, respectively.

The tote module 106 includes lighting element(s) 1008 that output the indication(s) 138. In some instances, the indication(s) 138 indicate whether the totes 114 are full (and need to be inducted to the fourth conveyor 208), whether totes 114 are located on the tote module 106 (e.g., loaded), which tote 114 the item(s) need to be deposited, and so forth. The tote module 106 may include lighting element(s) 1008 that are associated with each of the totes 114 and/or the tote slots 1000. For example, a first lighting element 1008(1) may be associated with the first tote slot 1000(1), a second lighting element 1008(2) may be associated with the second tote slot 1000(2), and a third lighting element 1008(3) may be associated with the third tote slot 1000(3). In some instances, the lighting element(s) 1008 may be disposed on a bar 1010 (e.g., rail, etc.) above the tote slots 1000. Additionally, or alternatively, the lighting element(s) 1008 may be disposed on the front rail 1006. In some instances, the bar 1010 may shield the light emitting from the lighting elements 1008.

As an example operation of the lighting element(s) 1008, a first indication (e.g., first color of light, such as blue) may be output when the tote 114 resides in the tote slot 1000. A second indication (e.g., a second color of light, such as orange) may be output when the tote 114 is not located in the tote slot 1000. For example, the first lighting element 1008(1) and the second lighting element 1008(2) may output a first indication, while the third lighting element 1008(3) may output a second indication. The first indication may indicate that the associate may place item(s) in the first tote 114(1) and the second tote 114(2), while the second indication may indicate to the associate that there is no tote in the third tote slot 1000(3), and to therefore avoid placing item(s) at such location. However, once a new tote 114 is replenished at the third tote slot 1000(3), the first indication may be output, indicating that the associate may place item(s) in the new tote.

The one or more sensor(s) 132, which may be disposed on, in, within, etc. the frame 122 at the tote module 106 may be used to determine the presence, as well as the absence, of the totes 114 in the tote slots 1000, respectively, for causing the first indication and the second indication to be output. The sensor(s) 132 at the tote module 106 may also be used to determine in which totes 114 the item(s) are placed. For example, the sensor(s) 132 may associate certain item(s) with the tote(s) 114 in order to track the item(s) throughout the environment. The association may also be used to record a weight and/or fill volume of the totes 114, and when the totes 114 are filled beyond a certain threshold and/or weight beyond a certain weight. Based on the fill of the totes 114, the totes 114 may be inducted onto the fourth conveyor 208. In some instances, the lighting element(s) 1008 may output an indication (e.g., third indication) that indicates when the totes 114 need to be inducted and/or replaced with an empty tote 114. In some instances, the associate may manually move (e.g., push) the totes 114 onto the fourth conveyor 208, or an actuator (e.g., linear actuator) disposed on the front rail 1006 may actuate to push the tote 114 onto the fourth conveyor 208.

In some instances, the tote module 106 may include a fullness mechanism 1012 that is used to detect if the tote 114 is too full, for example, above a top of the tote 114. In some instances, the fullness mechanism 1012 may represent a cord, bar, etc. that resides above the totes 114. If the tote 114 is inducted, but is too full and item(s) extend above the top of the tote 114, the item(s) may contact the fullness mechanism 1012. In some instances, this contact may be sensed via one or more sensor(s) 132 of the tote module 106, and may be used to provide an indication to the associate (e.g., visual, audible, etc.) and/or one or more operations at the station 100 may be halted. In other instances, if the items tug, contact, etc. the item(s), this may provide visual feedback to the associate that the totes 114 are too full, thereby permitting the associate to reorganize and/or redistribute the items. However, as noted above, the sensor(s) 132 may be used to determine whether the item(s) extend beyond the top of the totes and become full.

The tote module 106 may further include a drawer 1014 (e.g., slide) disposed vertically below the totes 114. The drawer 1014 may be used to store personal item(s) of the associate, supplies used at the station (e.g., tape, scissors, etc.).

Figure 11:
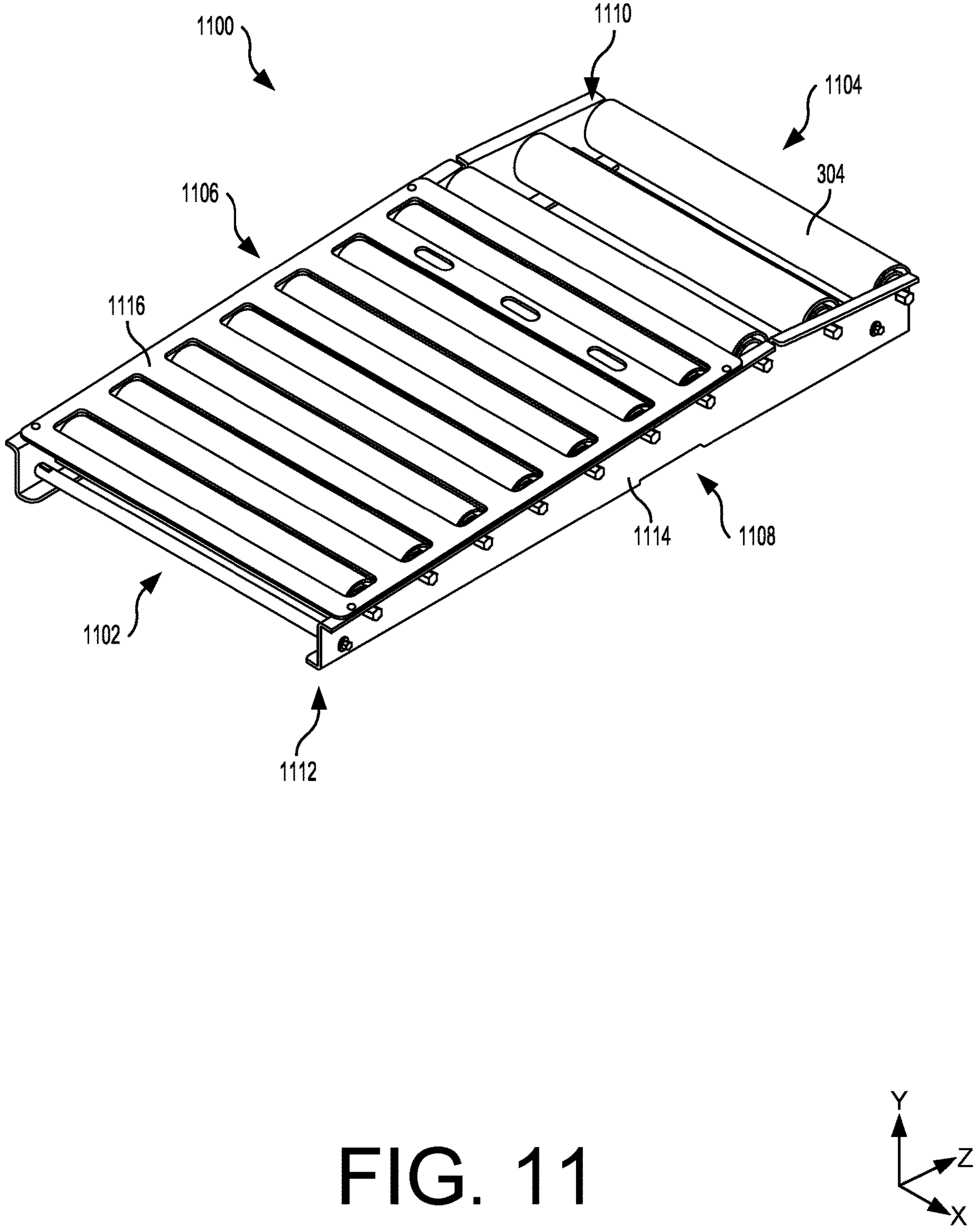
FIG. 11 illustrates an example roller of the tote module of FIG. 10, according to examples of the present disclosure.

FIG. 11 illustrates an example roller assembly 1100 of the tote module 106, according to examples of the present disclosure. The roller assembly 1100 may include a front 1102, a back 1104, a first side 1106, a second side 1108, a top 1110, and a bottom 1112. The roller assembly 1100 may include a frame 1114 to which the rollers 304 are mounted. The rollers 304 may extend in a direction from the first side 1106 to the second side 1108. The totes 114 may reside on the top 1110 of the roller assembly 1100, or a rolling surface formed by the rollers 304. In some instances, a guard 1116 may be disposed between at least a portion of the rollers 304. The guard 1116 may prevent feet, pegs, etc. of the tote 114 becoming stuck in between adjacent rollers 304 and/or may prevent items falling between the rollers 304.

Once the roller assembly 1100 is mounted to the tote module 106, or a frame, etc. of the tote module 106, the totes 114 may be tilted towards a front of the tote module 106 to prevent the totes 114 inadvertently being moved to the fourth conveyor 208. For example, the rollers 304, proximate to the back 1104, may be spaced apart from the bottom 1112 by a first distance, and the rollers 304, proximate to the front 1102, may be spaced apart from the bottom 1112 by a second distance that is less than the first distance. This may form an incline and situate the totes against the front rail 1006.

Figure 12A:
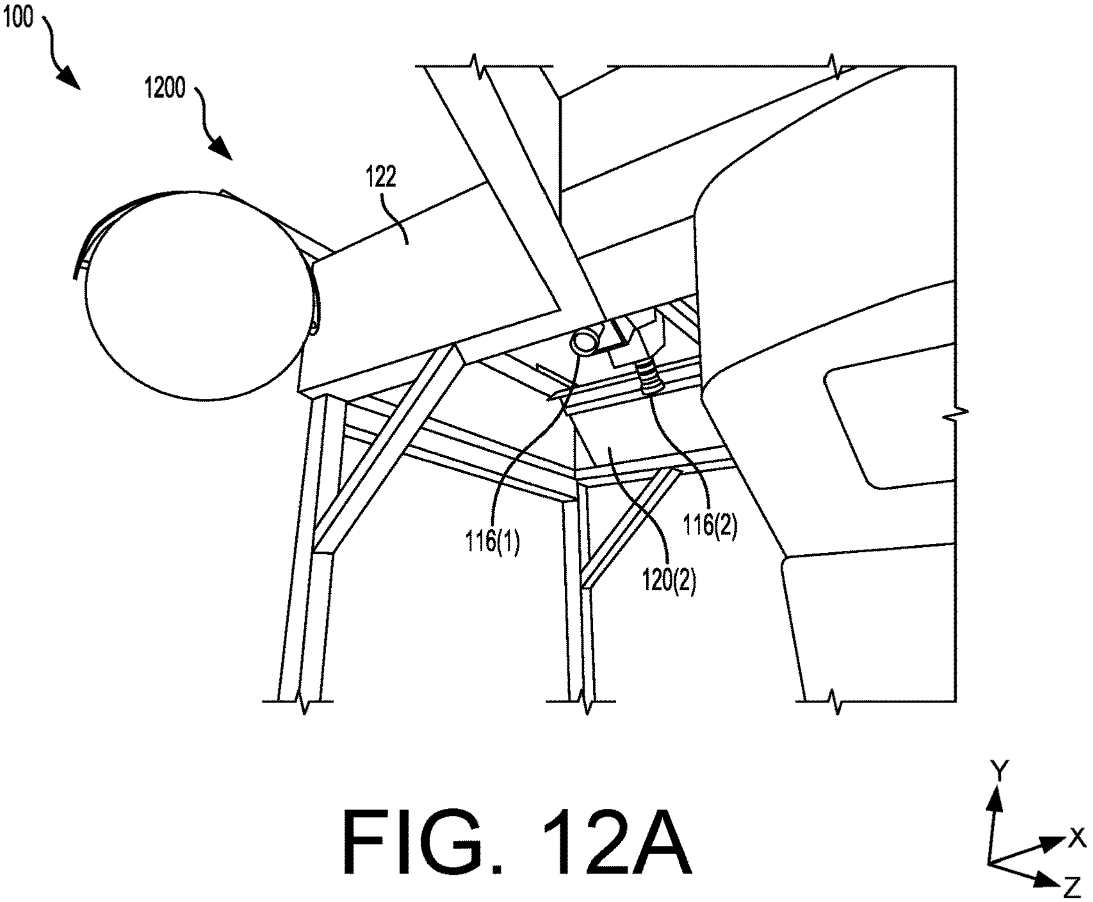
FIGS. 12A-12C illustrate an example frame of the station of FIG. 1, including example sensor(s) disposed on the frame, according to examples of the present disclosure.
Figure 12B:
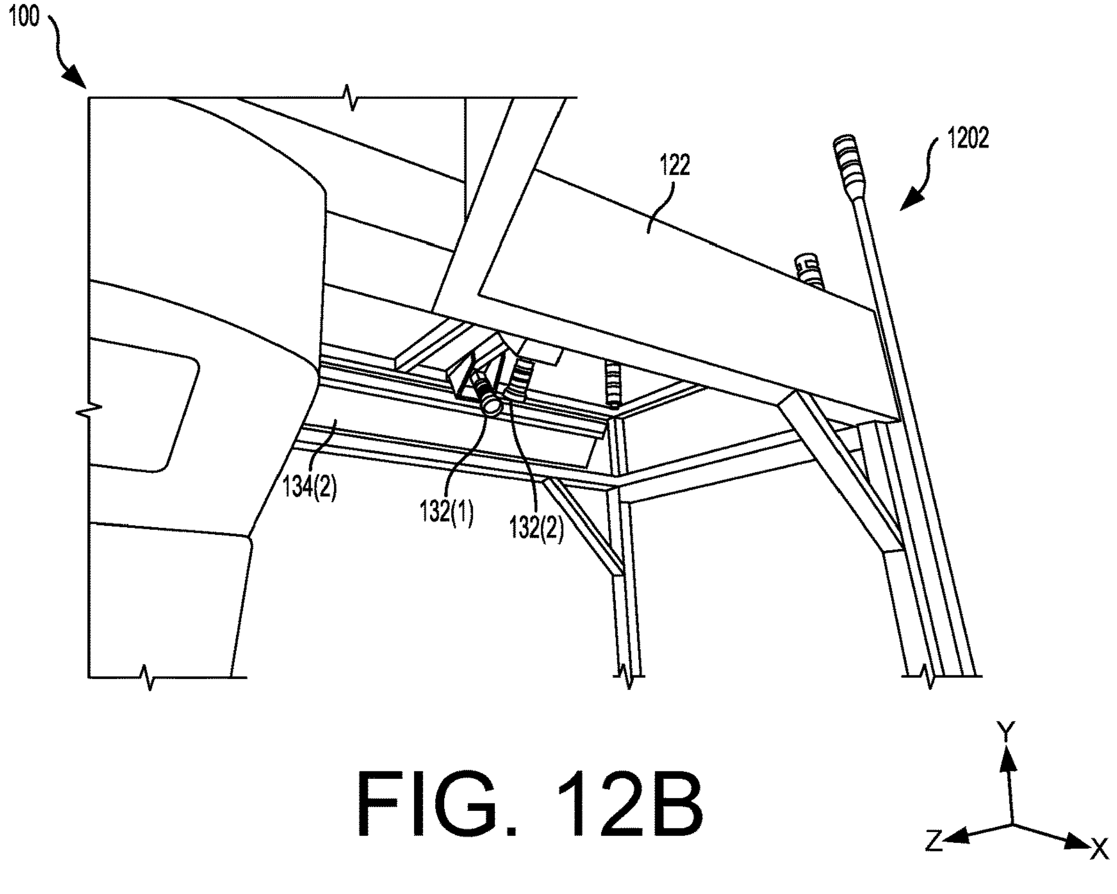
Figure 12C:
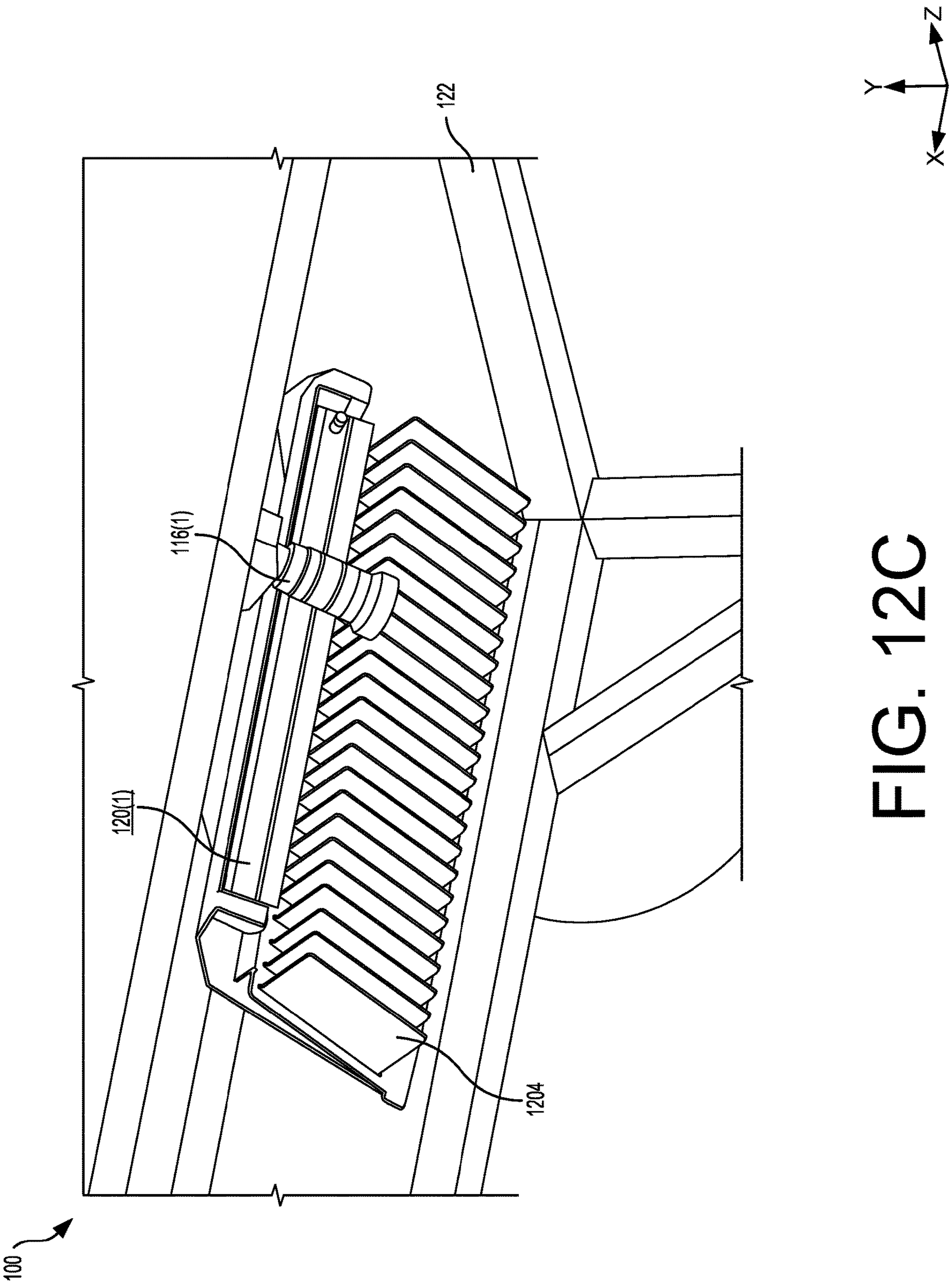

FIGS. 12A-12C illustrate various views of the frame 122, according to examples of the present disclosure. FIG. 12A illustrates a first end 1200 of the frame 122, disposed proximate to the case module 102. In some instances, the sensor(s) 116 may include a first sensor 116(1) having the FoV 400, and a second sensor 116(2). The first sensor 116(1) may be responsible for imaging the boxes 112 and the identifier thereof. The second sensor 116(2), in some instances, may be responsible for imaging boxes of another station, such as a station located behind the station 100 (e.g., in the Z-direction). In some instances, the second sensor 116(2) may additionally or alternatively be used for imaging the fourth conveyor 208 for determining whether totes 114 become jammed on the fourth conveyor 208. Additionally, the lighting element 120 may illuminate the FoV 400 of the first sensor 116(1) and/or a FoV of the second sensor 116(2). In some instances, the lighting element(s) 120 include the second lighting element 120(2) oriented towards the case module 102, and/or which illuminates the FoV 400, and the second lighting element 120(2) oriented toward a second station. The sensor(s) 116 may be disposed between the lighting element(s) 120.

FIG. 12B illustrates a second end 1202 of the frame 122, opposite the first end 1200, disposed proximate to the tote module 106. In some instances, the sensor(s) 132 include the first sensor 132(1) having the FoV 402, and a second sensor 132(2) having a FoV associated with a second tote module of another station. The first sensor 132(1) may be responsible for imaging the totes 114, such as the identifier of the totes 114, as well as the item(s) for determining in which totes 114 the item(s) are placed. The first sensor 132(1) may also be used to determine a fill of the totes 114, and/or whether the totes 114 are present, absent, etc. from the tote slots 1000. In some instances, the second sensor 132(2) may additionally be responsible for imaging the fourth conveyor 208 for determining whether totes 114 become jammed on the fourth conveyor 208.

The second lighting element 134(2) may illuminate the FoV 402 of the first sensor 132(1), while the first lighting element 134(1) may illuminate a FoV of the second sensor 132(2) (e.g., for illuminate a tote module of another station). The sensor(s) 132 may be disposed between the lighting element(s) 134.

FIG. 12C illustrates example baffles 1204 that may be used to reduce a glare of the lighting element(s) 120. As shown, the baffles 1204 may be disposed in from of the first lighting element 120(1). Although discussed as being used, or implemented, with the lighting element(s) 120, the baffles 1204 may be used with the lighting element(s) 134. The baffles 1204 may be disposed in front of the lighting element(s) 120 to reduce glare as light shines downward towards the case module 102.

Figure 13:
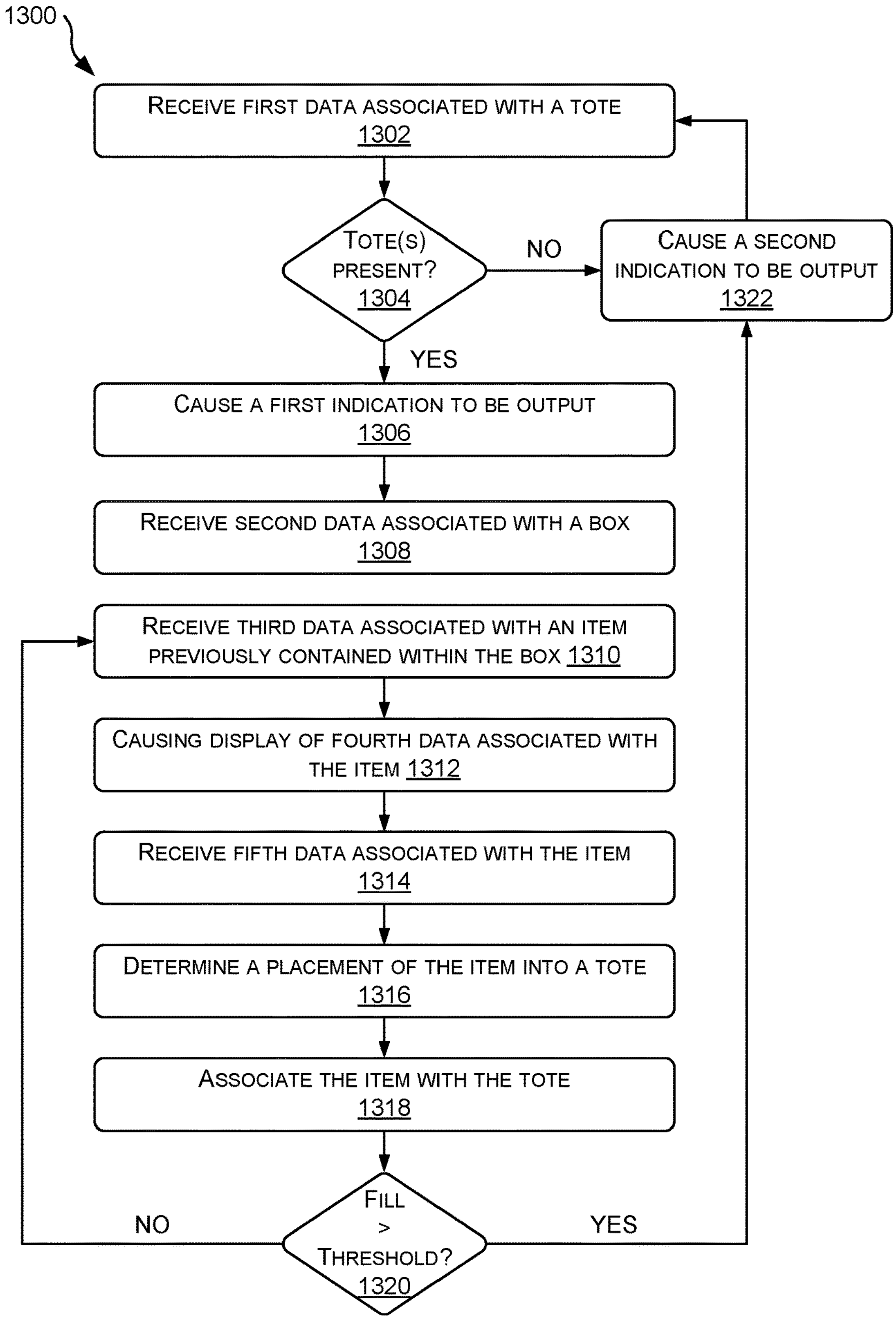
FIG. 13 illustrates an example process performed at least in part by the station of FIG. 1, according to examples of the present disclosure.

FIG. 13 illustrates a process 1300 (e.g., method) related to inducting item(s) into totes 114 using the station 100, according to examples of the present disclosure. The process 1300 described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process 1300, or alternative processes, and not all of the blocks need be executed. For discussion purposes, the process 1300 are described with reference to the environments, devices, architectures, diagrams, and systems described in the examples herein, such as, for example those described with respect to FIGS. 1-12C, although the process 1300 may be implemented in a wide variety of other environments, architectures, and systems.

In some instances, the process 1300 may be performed at least in part by the station 100, or components thereof, such as the case module 102, the camera and lighting module 104, and/or the tote module 106, processor(s), CPUs, computing components thereof, and so forth.

At 1302, the process 1300 may include receiving first data associated with a tote. For example, the sensor(s) 132 of the tote module 106 may generate the first data, which indicates whether the totes 114 are present within the tote slots 1000 of the tote module 106. The sensor(s) 132 generate the sensor data 118, for example, which is analyzed to determine whether a tote is located in each of the tote slots 1000.

At 1304, the process 1300 may include determining whether the tote(s) are present. For example, based at least in part on analyzing the sensor data 118, the process 1300 may determine which, if any, of the tote slots 1000 include the totes 114. In some instances, determining the presence or absence of the tote 114 may be based on being able or unable to read the identifier on the tote 114. If at 1304 the process 1300 determines that the tote is present, the process 1300 may follow the "YES" route and proceed to 1306.

At 1306, the process 1300 may include causing a first indication to be output. For example, based at least in part on sensing the presence of the tote 114, the lighting element(s) 1008 may be caused to output the first indication. In some instances, the process 1300 may determine the presence of the tote 114 in each of the tote slots 1000 for outputting the first indication. The first indication may be associated with a first color, a first intensity of light, a first pattern of light, etc. for signifying to the associate that the totes 114 are present, and therefore, able to be loaded with the item(s).

At 1308, the process 1300 may include receiving second data associated with a box. For example, the sensor(s) 116 of the case module 102 may generate data (e.g., sensor data 118 and/or image data 126) indicating contents of the box 112 (e.g., type of item(s), quantity of item(s), weight of item(s), etc.). In some instances, based on the data, the display 130 may present information associated with the contents within the box 112.

At 1310, the process 1300 may include receiving third data associated with an item. For example, once the box 112 is opened, the item may be removed from the box 112 and passed over the camera and lighting module 104. The third data (e.g., sensor data 118 and/or image data 126) may be generated via one or more of the camera(s) 124 of the camera and lighting module 104, or the camera and lighting subassemblies 300. The camera(s) 124 may read an identifier of the item(s) to understand characteristic(s) of the item (e.g., weight, material, etc.).

At 1312, the process 1300 may include causing display of fourth data associated with the item. For example, once the item is scanned, the display 130 may present information associated with the item. In some instances, the display 130 may display the characteristics of the item, a tote into which the item is to be sorted, and so forth.

At 1314, the process 1300 may include receiving fifth data associated with the item. For example, the fifth data (e.g., sensor data 118 and/or image data 126) may be generated via the sensor(s) 132 of the tote module 106. The fifth data may indicate a placement of the item into one of the totes 114.

At 1316, the process 1300 may include determining a placement of the item into a tote. For example, based at least in part on the fifth data, the process 1300 may determine into which of the totes 114 the item is placed.

At 1318, the process 1300 may associate the item with the tote. For example, associating the item with the tote 114 may be used to track the item throughout the environment, after the tote 114 is inducted into the environment (e.g., via the second conveyor 204). In other words, the association may indicate that the item is placed, stored, etc. into the tote 114. Each of the totes 114 may be stored in association with tote data 148, where the tote data 148 may indicate those item(s) that are stored in the totes 114, respectively.

At 1320, the process 1300 may include determining whether a fill of the tote is greater than a threshold. For example, data generated by the sensor(s) 132 may be used to determine whether a percentage full, a fill volume, etc. of the totes 114. Additionally, or alternatively, through the association of the item(s) with the totes 114, respectively, a weight of the item(s) within the tote 114 may be known and/or a fill of the totes 114 may be known (e.g., based on the characteristic(s) of the item). If at 1318 the process 1300 determines that the fill is not greater than the threshold, the process 1300 may follow the "NO" route and proceed to 1310. Here, the first indication may be output to indicate that the tote may be filled within additional items.

Alternatively, if at 1320 the process 1300 determines that the fill is greater than the threshold, the process may follow the "YES" route and proceed to 1322. At 1322, the process 1300 may include causing a second indication to be output. The second indication, which may be different than the first indication (e.g., a second color, a second intensity of light, a second pattern of light, etc.) for signifying to the associate that the tote 114 is full. This may signify to the associate to induct the tote 114, to refrain from placing additional item(s) into the tote 114, and/or to replenish a new tote 114 within the tote module 106. The process 1300 may also proceed to 13222 following the "NO" route from 1304. For example, when the tote 114 is not present within the tote slot, for example, the second indication may be output to indicate to the associate as to the absence of the tote 114.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A station for inducting items into an environment, the station comprising:

a case module configured to receive boxes containing one or more items, the case module including a first camera;

a camera and lighting module including:

a first camera and lighting subassembly having a second camera and a first lighting element, the second camera being oriented in a first direction, a second camera and lighting subassembly having a third camera and a second lighting element, the third camera being oriented in a second direction different than the first direction, a third camera and lighting assembly having a fourth camera and a third lighting element, the fourth camera being oriented in a third direction different than the second direction, and a fourth camera and lighting assembly having a fifth camera and a fourth lighting element, the fifth camera being oriented in a fourth direction different than the third direction, a tote module configured to receive at least a first tote and a second tote in which the one or more items are placed, the tote module including a sixth camera;

one or more processors; and one or more non-transitory computer-readable media storing instructions that, when executed, cause the one or more processors to perform acts comprising:

receiving, from the first camera, first data associated with a first identifier of a box containing an item, receiving, from at least one of the second camera, the third camera, the fourth camera, or the fifth camera, second data associated with a second identifier of the item, receiving, from the sixth camera, third data associated with a third identifier of a tote, receiving, from the sixth camera, fourth data associated with a placement of the item into the first tote, and associating, based on the fourth data, the item with the first tote.

2. The station of claim 1, wherein the tote module further includes a fifth lighting element associated with the first tote and a sixth lighting element associated with the second tote, the acts further comprising:

receiving, from the sixth camera, fifth data associated with the tote module;

determining, based on the fifth data, a presence of the first tote at the tote module;

causing, based on the presence of the first tote, the fifth lighting element to output a first indication;

determining, based on the fifth data, an absence of the second tote at the tote module; and causing, based on the absence of the second tote, the sixth lighting element to output a second indication different than the first indication.

3. The station of claim 1, wherein:

the first camera and lighting subassembly includes a first housing having:

a first channel in which the second camera is at least partially disposed, and first baffles for reducing first glare of the first lighting element;

the second camera and lighting subassembly includes a second housing having:

a second channel in which the third camera is at least partially disposed, and second baffles for reducing second glare of the second lighting element;

the third camera and lighting subassembly includes a third housing having:

a third channel in which the fourth camera is at least partially disposed, and third baffles for reducing third glare of the third lighting element; and the fourth camera and lighting subassembly includes a fourth housing having:

a fourth channel in which the fifth camera is at least partially disposed, and fourth baffles for reducing fourth glare of the fourth lighting element.

4. The station of claim 1, wherein the station is configured to receive the boxes from a first conveyor, further comprising:

a frame disposed overhead of the case module, the camera and lighting module, and the tote module;

the first camera, the second camera, the first lighting element, and the sixth camera are disposed on the frame; and a second conveyor in which the first tote and the second tote are inducted, the second conveyor being connected to a third conveyor that transports the first tote and the second tote throughout the environment.

5. A station comprising:

a platform configured to receive a first container including items;

a housing including:

a first sensor having a first field of view (FoV) for sensing the items once removed from the first container, a first lighting element associated with the first sensor for at least partially illuminating the first FoV, a second sensor having a second FoV for sensing the items once removed from the first container, and a second lighting element associated with the second sensor for at least partially illuminating the second FoV;

a first frame on which second containers are configured to be disposed for receiving the items;

a second frame disposed at least partially over the platform, the housing, and the first frame, the second frame including:

a third sensor configured to sense the first container, a third lighting element configured to illuminate the first container, a fourth sensor configured to sense the second containers, and a fourth lighting element configured to illuminate the second containers;

one or more processors; and one or more non-transitory computer-readable media storing instructions that, when executed, cause the one or more processors to perform acts comprising:

receiving, from the third sensor, first data associated with the first container, receiving, from at least one of the first sensor or the second sensor, second data associated with an item removed from the first container, receiving, from the fourth sensor, third data associated with the item being placed into a second container of the second containers, and associating the item with the second container.

6. The station of claim 5, the acts further comprising:

receiving, from at least one of the first sensor or the second sensor, fourth data associated with a second item removed from the first container;

receiving, from the fourth sensor, fifth data associated with the second item being placed into a third container of the second containers; and associating the second item with the third container.

7. The station of claim 5, further comprising a fifth lighting element coupled to the platform and illuminating the first container.

8. The station of claim 5, further comprising:

a fifth sensor having a third FoV for sensing the items once removed from the first container;

a fifth lighting element associated with the fifth sensor for at least partially illuminating the third FoV;

a sixth sensor having a fourth FoV for sensing the items once removed from the first container; and a sixth lighting element associated with the sixth sensor for at least partially illuminating the fourth FoV.

9. The station of claim 8, wherein:

the fifth sensor and the third lighting element are coupled to the second frame; and the sixth sensor and the fourth lighting element are disposed in the housing.

10. The station of claim 8, wherein:

the first sensor is oriented in a first direction;

the second sensor is oriented in a second direction different than the first direction;

the fifth sensor is oriented in a third direction different than the second direction;

the sixth sensor is oriented in a fourth direction different than the third direction; and the first FoV, the second FoV, the third FoV, and the fourth FOV at least partially overlap.

11. The station of claim 5, further comprising:

a first housing defining first baffles and a first channel, the first sensor being disposed at least partially within the first channel, the first lighting element emitting light through the first baffles; and a second housing defining second baffles and a second channel, the second sensor being disposed at least partially within the second channel, the second lighting element emitting light through the second baffles.

12. The station of claim 5, further comprising a display coupled to the housing, the acts further comprising:

causing, and based at least in part on receiving the first data, fourth data associated with the first container to be displayed on the display; and causing, based at least in part on receiving the second data, fifth data associated with the item to be displayed on the display.

13. The station of claim 5, further comprising a fifth lighting element, the acts further comprising:

receiving, from the fourth sensor, fourth data associated with a presence of the second container; and causing, based at least in part on the fourth data, output of an indication via the fifth lighting element.

14. The station of claim 13, the acts further comprising:

receiving, from the fourth sensor, fifth data associated with an absence of the second container;

causing, via the fifth lighting element and based at least in part on the fifth data, output of a second indication that is different than the indication;

receiving, from the fourth sensor, sixth data associated with a presence of a third container of the second containers in a previous location of the second container; and causing, based at least in part on the sixth data, output of the indication via the fifth lighting element.

15. The station of claim 5, wherein:

a first conveyor conveys the first container to the station;

the station includes a second conveyor that receives the second container; and the second conveyor connects to a third conveyor that conveys the second containers throughout an environment.

16. A method comprising:

receiving, from a first sensor disposed on a first frame, first data associated with a first container having one or more items, the first container being disposed on a platform, wherein the first frame is disposed at least partially over the platform;

causing, via a display, display of second data associated with the first container; receiving, from one or more second sensors disposed in a housing, third data associated with an item of the one or more items contained in the first container, the one or more second sensors having one or more fields of view, one or more lighting elements being associated with the one or more second sensors for at least partially illuminating the one or more fields of view;

causing, via the display of the housing, display of third data associated with the item;

receiving, from a third sensor disposed on the first frame, fourth data associated with a second container in which the one or more items are to be placed, the second container being disposed on a second frame;

causing, via a lighting element, output of a first indication associated with a presence of the second container;

receiving, from the third sensor, fifth data associated with a placement of the item into the second container;

associating the item with the second container;

receiving, from the third sensor, sixth data associated with the second container; and causing, via the lighting element, output of a second indication associated with an absence of the second container, the second indication being different than the first indication.

17. The method of claim 16, further comprising:

receiving, via the third sensor, seventh data associated with a third container, the third container residing in a previous location of the second container; and causing, via the lighting element, output of a third indication associated with a presence of the third container.

18. The method of claim 16, wherein the one or more second sensors include at least one of:

a first camera oriented in a first direction and having a first field of view (FoV);

a second camera oriented in a second direction and having a second FoV, the second direction being different than the first direction and the second FOV at least partially overlapping with the first FoV;

a third camera oriented in a third direction and having a third FoV, the third direction being different than the second direction and the third FoV at least partially overlapping with the second FoV; or a fourth camera oriented in a fourth direction and having a fourth FoV, the fourth direction being different than the third direction and the fourth FOV at least partially overlapping with the third FoV.

19. The method of claim 16, further comprising:

receiving, from the one or more second sensors, seventh data associated with a second item contained in the first container;

causing, via the display, display of eighth data associated with the second item;

receiving, from the third sensor, ninth data associated with a placement of the second item into a third container; and associating the second item with the third container.

20. The method of claim 16, wherein:

one or more lighting elements illuminate a field of view of the one or more second sensors; and the one or more lighting elements emit light through baffles for reducing glare.

* * * * *